United States Patent [19]

Otsuji et al.

[11] Patent Number: 5,302,571
[45] Date of Patent: Apr. 12, 1994

[54] CRYSTALS OF FLUORAN COMPOUND, CRYSTALLINE SOLVATES THEREOF, PROCESS FOR THEIR PREPARATION AND RECORDING MATERIAL COMPRISING SAID CRYSTAL OR SAID SOLVATE

[75] Inventors: Atsuo Otsuji; Masakatsu Nakatsuka; Kiyoharu Hasegawa; Kazuyoshi Kikkawa; Akihiro Yamaguchi, all of Kanagawa, Japan

[73] Assignee: Mitsui Toatsu Chemicals, Inc., Tokyo, Japan

[21] Appl. No.: 75,935
[22] Filed: Jun. 14, 1993

Related U.S. Application Data

[62] Division of Ser. No. 729,299, Jul. 12, 1991, Pat. No. 5,245,049.

[30] Foreign Application Priority Data

Jul. 12, 1990 [JP] Japan ............... 2-182641
Oct. 2, 1990 [JP] Japan ............... 2-263040
Feb. 26, 1991 [JP] Japan ............... 3-30956

[51] Int. Cl.$^5$ .................. B41M 5/145; B41M 5/30
[52] U.S. Cl. .................. 503/221; 427/151; 503/213
[58] Field of Search ............ 427/151; 503/213, 221

[56] References Cited

U.S. PATENT DOCUMENTS

| 4,330,473 | 5/1982 | Hitano et al. | 549/226 |
| 4,629,800 | 12/1986 | Yonese et al. | 549/226 |
| 4,642,357 | 2/1987 | Yahazi et al. | 549/226 |
| 4,749,796 | 6/1988 | Sensui et al. | 549/226 |
| 4,806,657 | 2/1989 | Zink | 549/226 |
| 4,837,210 | 6/1989 | Dwyer-Hollquist et al. | 549/226 |
| 5,071,480 | 12/1991 | Zink | 549/226 |

FOREIGN PATENT DOCUMENTS

| 176161 | 4/1986 | European Pat. Off. | 549/226 |
| 410206 | 1/1989 | European Pat. Off. | 549/226 |
| 3407369 | 8/1985 | Fed. Rep. of Germany | 549/226 |
| 48-43296 | 12/1973 | Japan | 549/226 |
| 51-23204 | 7/1976 | Japan | 549/226 |
| 59-68373 | 4/1984 | Japan | 549/226 |
| 0120654 | 7/1984 | Japan | 549/226 |
| 0047068 | 3/1985 | Japan | 549/226 |
| 60-141762 | 7/1985 | Japan | 549/226 |
| 60-174833 | 9/1985 | Japan | 549/226 |
| 61-74883 | 4/1986 | Japan | 549/226 |
| 61-264058 | 11/1986 | Japan | 549/226 |

OTHER PUBLICATIONS

Patent Abstracts of Japan, vol. 9, No. 175, Jul. 19, 1985 (JP-A-60 47 068 Mar. 14, 1985).
Patent Abstracts of Japan, vol. 12, No. 1, Jan. 6, 1988 (JP-A-62-167086 Jul. 23, 1987).

*Primary Examiner*—Patrick J. Ryan
*Attorney, Agent, or Firm*—Millen, White, Zelano, & Branigan

[57] ABSTRACT

Disclosed are a crystal and crystalline solvate of a fluoran compound represented by the formula

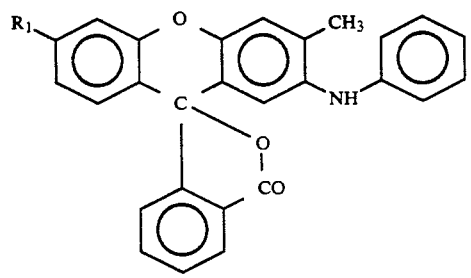

wherein $R_1$ is

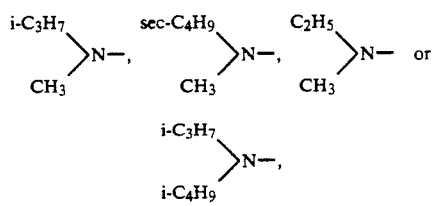

and which are useful as chromogenic compounds in recording materials such as pressure-sensitive and heat-sensitive recording materials, a process for preparation of said crystal and said crystalline solvate, and recording materials comprising said crystal or said crystalline solvate.

11 Claims, 15 Drawing Sheets

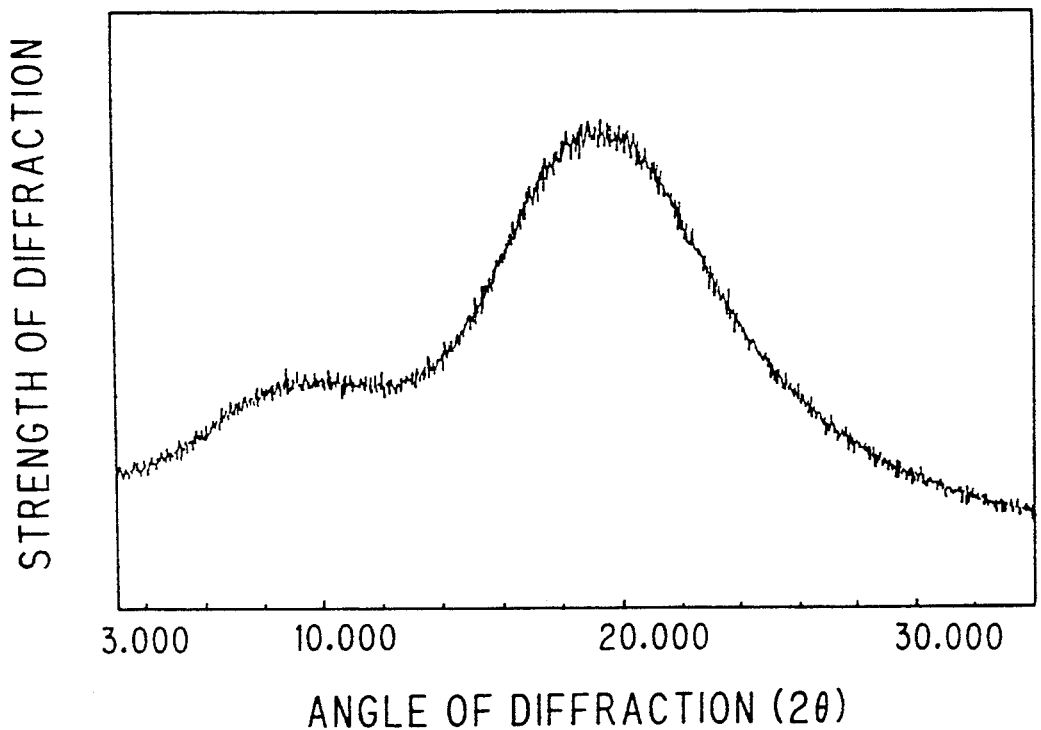
F I G. 29

CRYSTALS OF FLUORAN COMPOUND, CRYSTALLINE SOLVATES THEREOF, PROCESS FOR THEIR PREPARATION AND RECORDING MATERIAL COMPRISING SAID CRYSTAL OR SAID SOLVATE

This is a division of application Ser. No. 07/729,299 filed Jul. 12, 1991 U.S. Pat. No. 5,245,049.

BACKGROUND OF THE INVENTION

1. Field of the Invention

The present invention relates to a crystal and crystalline solvate of a fluoran compound which are useful as chromogenic compounds in recording materials such as pressure-sensitive and heat-sensitive recording materials, a process for preparation of said crystal and said crystalline solvate, and recording materials comprising said crystal or said crystalline solvate.

2. Description of the Related Art

Pressure-sensitive recording, heat-sensitive recording and electroheat-sensitive recording have conventionally been used as systems for recording transferred information through the mediation of external energy such as pressure, heat or electricity by utilizing a color reaction between a colorless or pale colored electron donor compound (chromogenic compound) and an organic or inorganic electron acceptor (developer).

In these system, fluoran compounds have widely been used as the chromogenic compound.

Many fluoran compounds are known in the prior art, including those having structures of the formulas (A), (B), (C), and (D):

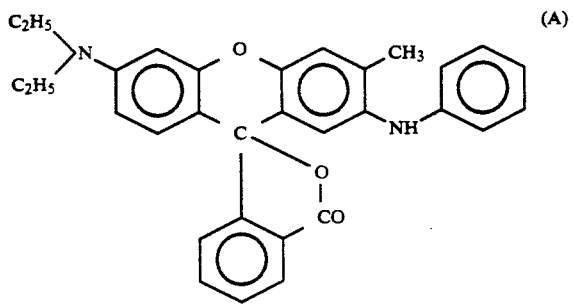

Japanese Patent Publication SHO 48-43296(1973)

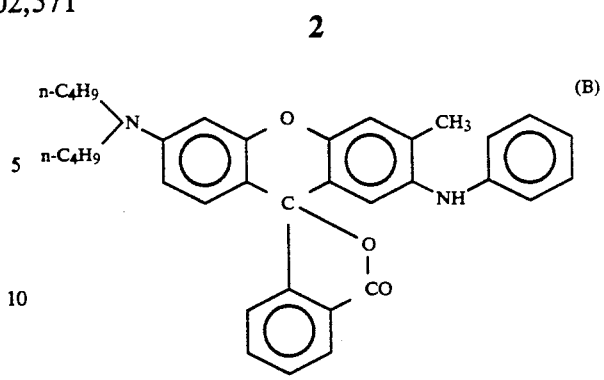

Japanese Patent Publication SHO 48-43296(1973)
Japanese Patent Laid-Open Publication SHO 60-202155(1985)

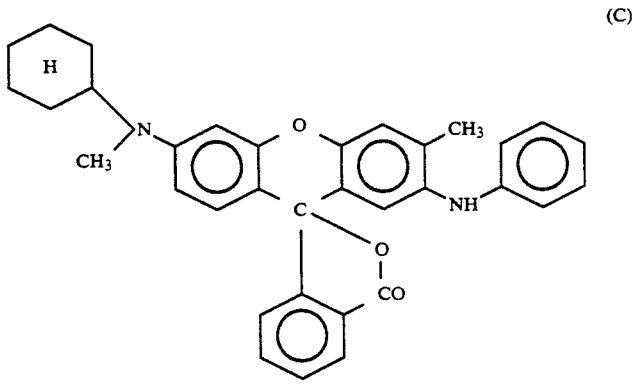

Japanese Patent Publication SHO 51-23204(1976)

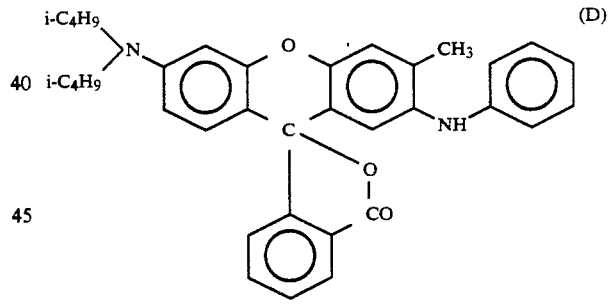

Japanese Patent Laid-Open Publication SHO 61-264058(1986)

However, the compound of the formula (A) has the disadvantage of very low solubility in capsule oil when the compound is used for a pressure-sensitive recording material. Additionally, in the case of applying to the heat-sensitive recording material, the compound itself colors gray to dark gray when mixed with a developer such as bisphenol A and has the defect of providing only a gray to dark gray colored (soiled) paper by applying the compound to the paper.

The color forming temperatures of the compounds having the formulas (B), (C) and (D) are too high to permit their use in a heat-sensitive recording material. Consequently, the performance in these prior art compounds cannot fully meet the present market demand for more rapid and higher density recording. Therefor, a chromogenic compound capable of quickly developing color at lower temperatures has been strongly desired.

Further, the compounds of the formulas (B), (C) and (D) are poorly soluble in capsule oil and their performance is still unsatisfactory for use in the pressure-sensitive recording material.

Japanese Laid-Open Patent SHO 60-47068(1985) discloses fluoran compounds of the formula (I) wherein $R^1$ is a

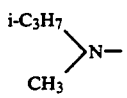

group, the compound of the formula (I-a), and a

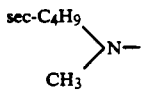

group, the compound of the formula (I-b). The compound of the formula (I-b) was described further in detail.

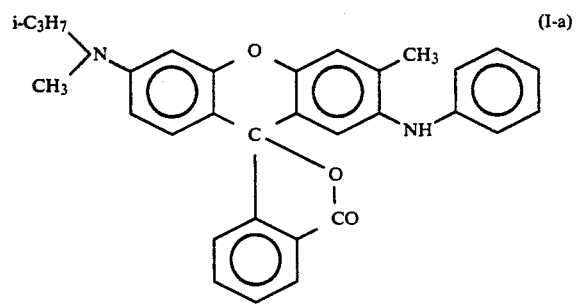

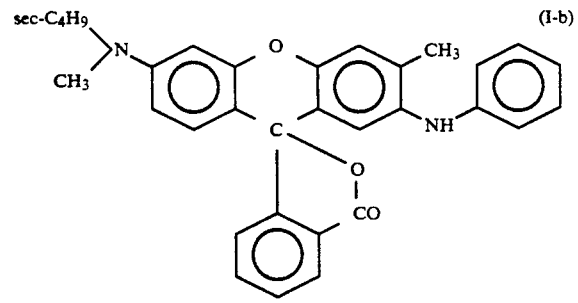

However, the compound of the formula (I-b) which is obtained by precipitating the fluoran compound of the formula (I) from an aqueous methanol solution as described in the patent is substantially amorphous, has low bulk density, scatters in the air during handling, and also has problems on practical use in view of transfer, workability and batching.

The compound of the formula (I-a) obtained by the same process has also low bulk density and is difficult to handle.

Japanese Laid-Open Patent SHO 61-74883(1986) disclosed pressure-sensitive and heat-sensitive recording papers obtained by using the fluoran compounds of the formulas (I-a) and (I-b). However, the description is unsatisfactory for the fluoran compound used and does not distinguish between the amorphous state and the crystal. As mentioned above, the fluoran compounds of the formulas (I-a) and (I-b) which are prepared by the process described in Japanese Laid-Open Patent SHO 60-47068(1985) are substantially amorphous. When heat-sensitive recording papers were prepared by using these amorphous compounds as chromogenic compounds and bisphenol A as a developer, soil was developed on the uncolored portion of the resulting papers and serious problems were liable to occur in practical use.

Japanese Laid-Open Patent SHO 60-141762(1985) suggests fluoran compounds of the formula (I) wherein $R_1$ is a

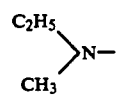

group, the compound of the formula (I-c), and a

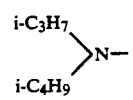

group the compound of the formula (I-d).

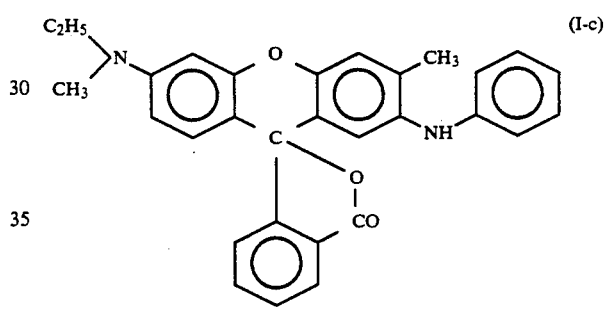

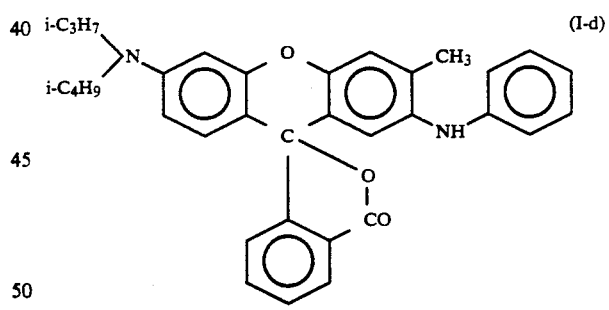

However, no practical description is found at all on the compounds of the formulas (I-c) and (I-d).

According to the results of experiments, the fluoran compounds of the formulas (I-c) and (I-d) obtained by precipitating, for example, from an aqueous methanol solution were substantially amorphous, had low bulk density, and were difficult to handle.

The heat-sensitive recording sheets using the fluoran compound of the formula (I-d) are also proposed in Japanese Laid-Open Patent SHO 61-74883(1986). However, the description is unsatisfactory for the fluoran compound used and does not distinguish between the amorphous state and the crystal. When heat-sensitive recording papers were prepared by using these amorphous compounds as chromogenic compounds and bisphenol A as a developer, soil was developed on the uncolored portion of the resulting papers and serious problems were liable to occur in practical use.

The crystalline solvates consisting of the fluoran compound of the formula (I) and an aromatic hydrocarbon-based solvent, alcohol-based solvent or ketone-based solvent are not disclosed at all in Japanese Laid-Open Patent SHO 60-47068(1985), 61-74883(1986) and 60-141762(1986).

OBJECT OF THE INVENTION

The object of the present invention is to provide crystals and crystalline solvates of the fluoran compound represented by the formula (I) which have excellent properties as a chromogenic compound of pressure-sensitive and heat-sensitive recording materials and have further improved handling characteristics when used in these recording materials.

SUMMARY OF THE INVENTION

The present inventors have carried out an intensive investigation on the compound represented by the formula (I) in order to accomplish the above object. As a result, they have found that a conventionally unknown crystal exists in the compound represented by the formula (I), that the compound forms a crystalline solvate with an aromatic hydrocarbon-based solvent, alcohol-based solvent or a ketone-based solvent, that the crystal and the crystalline solvate have higher bulk density and better workability on handling as compared with conventionally known amorphous compound, and that the crystal and the crystalline solvate have excellent properties as chromogenic compounds of recording materials such as pressure-sensitive and heat-sensitive recording materials. The present invention has thus been completed.

One aspect of the invention is a crystal of the fluoran compound represented by the formula (I):

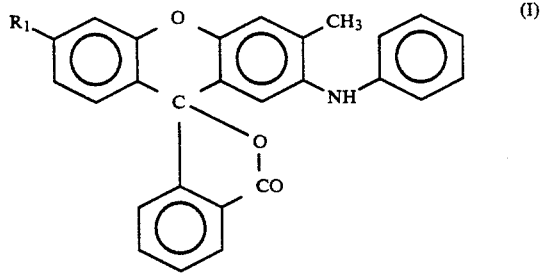

wherein $R_1$ is

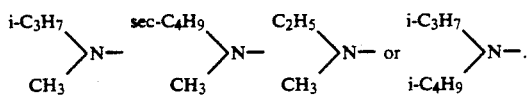

Another aspect of the invention is a crystalline solvate of a fluoran compound consisting of the fluoran compound and an aromatic hydrocarbon-based solvent, alcohol-based solvent or a ketone-based solvent.

A further aspect of the invention is a preparation process of said crystal and said crystalline solvate.

A still further aspect of the invention is a recording material comprising said crystal or said crystalline solvate.

The crystal and the crystalline solvate of the fluoran compound in the invention have very good solubility in capusule oil as chromogenic compounds of pressure-sensitive recording materials as compared with conventionally known fluoran compounds. The crystal and the crystalline solvate have excellent color forming ability at lower temperatures, i.e., coloring sensitivity, as the chromogenic compound of heat-sensitive recording materials.

Further the crystal and the crystalline solvate of the fluoran compound in the invention have higher bulk density and good handling properties as compared with conventionally known amorphous fluoran compounds and also have good whiteness of uncolored portion on the recording paper when used as chromogenic compounds of heat-sensitive recording materials in particular.

Thus, the crystal and the crystalline solvate of the fluoran compound in the present invention are useful chromogenic compounds in industry.

BRIEF DESCRIPTION OF THE DRAWINGS

In the drawings, Figures from 1 to 29 illustrate powder X-ray diffraction diagrams of crystal and the crystalline solvate of the invention and amorphous fluoran compounds.

In each drawing, the axis of abscissa indicates an angle of diffraction (2θ) and the axis of ordinate indicates strength of diffraction.

FIG. 29: Fluoran Compound of Formula (I-d) prepared in Comparative Example 4.

DETAILED DESCRIPTION OF THE INVENTION

Figure 1:
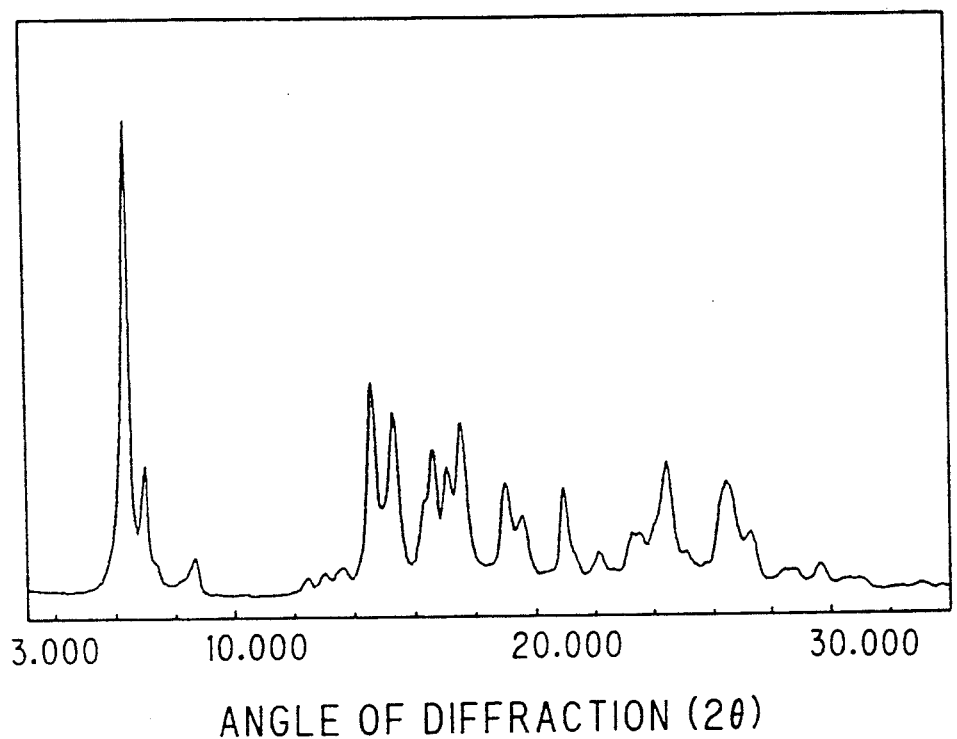
FIG. 1: Type (I-a)-1 Crystal.

The fluoran compounds represented by the formula (I) in the present invention are practically illustrated by the formulas (I-a), (I-b), (I-c) and (I-d):

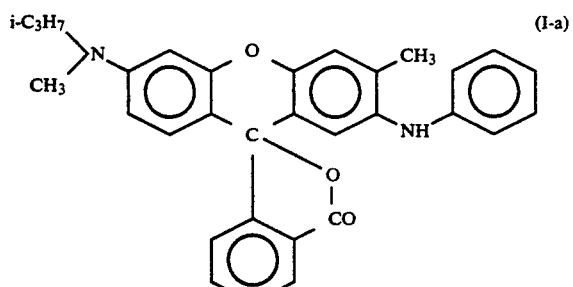 (I-a)

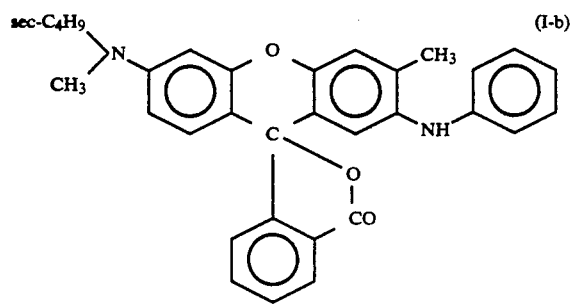 (I-b)

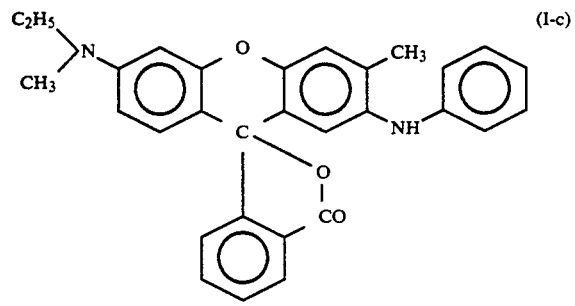 (I-c)

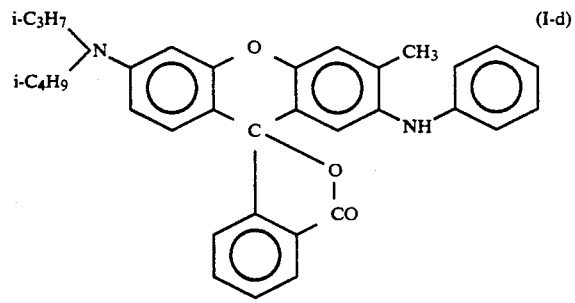 (I-d)

The fluoran compounds illustrated by the formulas (I-a), (I-b), (I-c) and (I-d) can be prepared by reacting benzoic acid derivatives having the formulas:

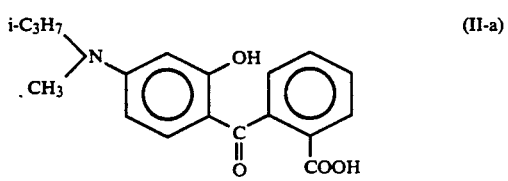 (II-a)

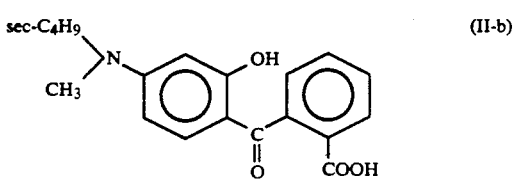 (II-b)

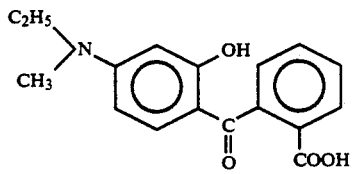 (II-c)

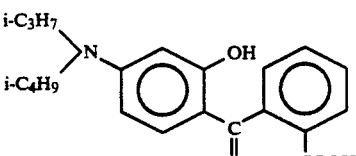 (II-d)

with a diphenylamine derivative represented by the formula (III):

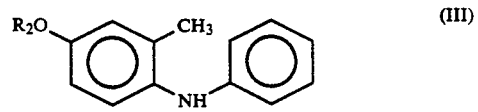 (III)

wherein $R_2$ is a lower alkyl group having a from 1 to 4 carbon atoms, in the presence of a dehydrating-condensation agent such as concentrated sulfuric acid, mixture of oleum and concentrated sulfuric acid, polyphosphoric acid, phosphorus pentoxide and anhydrous aluminum chloride, preferably in concentrated sulfuric acid, and thereafter bringing the reaction mixture to an alkaline pH.

The time and temperature of the dehydrating condensation reaction is not critical and is usually carried out at 0° to 100° C. for from several hours to 100 hours. When the reaction is carried out in concentrated sulfuric acid, the preferred reaction temperature is in the range of 0° to 50° C. The reaction time depends upon the selected reaction temperature and hence the reaction is conducted for a sufficient time to permit the reaction to go to completion.

After the dehydrating condensation reaction is completed, the alkali treatment is usually carried out by addition of a base, e.g., aqueous potassium hydroxide or sodium hydroxide solution to adjust the pH an alkaline value, e.g., 9 to 12. The treatment can be conducted in a temperature range of 0° to 100° C. The alkali treatment may be carried out in the presence of an organic solvent other than water, for example, benzene or toluene.

The crystal and crystalline solvate of the fluoran compound of the present invention can be prepared by precipitating the fluoran compound formed through the above common reaction process in the form of crystal under the below described conditions.

The crystal and crystalline solvate of the fluoran compound of the present invention will hereinafter be illustrated in detail.

As will be described below, the crystal of the fluoran compound of the invention comprises the fluoran compound represented by the formula (I) and is prepared by the process of precipitating the compound in the form of crystal from a solution of the compound in an organic solvent having a moisture-content of 50% by weight or less, or by the process of dissolving the amorphous fluoran compound represented by the formula (I) in an organic polar solvent having a moisture content of 50% by weight or less and successively precipitating the compound in the form of crystal.

A specific crystal form exists in each fluoran compound represented by the formula (I) wherein $R_1$ is

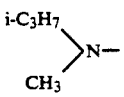

i.e., the compound of the formula (I-a):

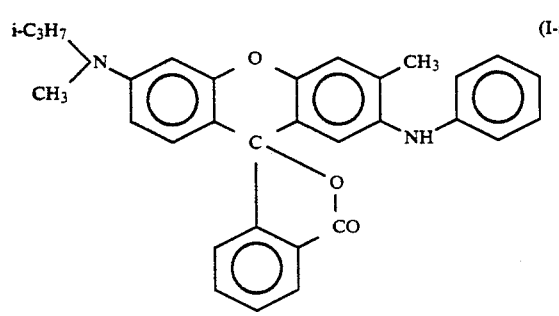

wherein $R_1$ is

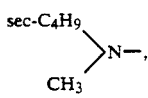

i.e., the compound of the formula (I-b):

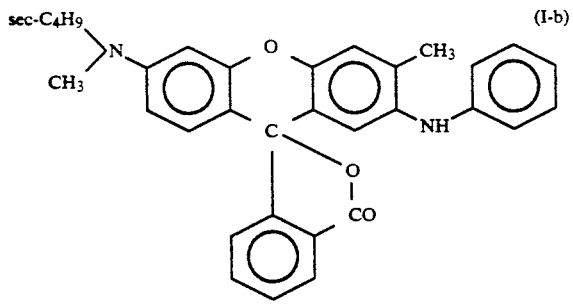

wherein $R_1$ is

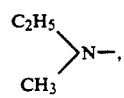

i.e., the compound of the formula (I-c):

and wherein $R_1$ is

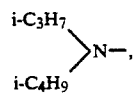

i.e., the compound of the formula (I-d):

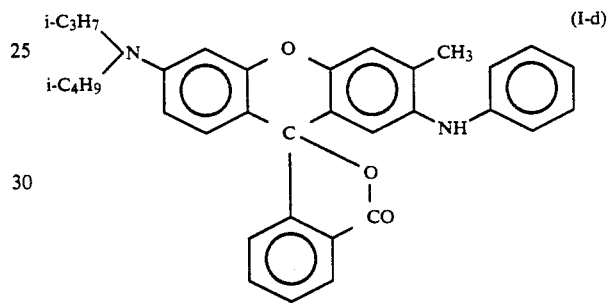

Particularly the fluoran compound having the formula (I-a) has two kinds of crystalline form (crystal modification).

One of the crystalline form is characterized in a high peak at a diffraction angle (2θ) of 6.4° in an X-ray diffraction diagram by the Cu-Kα beam [the crystal is referred to as type (I-a)-1 crystal hereinafter]. The other crystal form is characterized in high peaks at diffraction angles of 20.3° and 20.5° in an X-ray diagram by the Cu-Kα beam [the crystal is hereinafter referred to as type (I-a)-2 crystal].

The crystal of the fluoran compound having the formula (I-b) is characterized in high peaks at diffraction angles (2θ) of 7.1°, 18.5°, 20.0°, 20.5° and 21.4° in an X-ray diffraction diagram by the Cu-Kα beam [the crystal is hereinafter referred to as type (I-b)-1 crystal].

The crystal of the fluoran compound having the formula (I-c) is characterized in high peaks at diffraction angles (2θ) of 16.5° and 20.4° and relatively high peaks at diffraction angles (2θ) of 11.9°, 17.8°, 18.3°, 19.2° and 20.0° in an X-ray diffraction diagram by the Cu-Kα beam [hereinafter, the crystal is referred to as type (I-c)-1 crystal].

The crystal of the fluoran compound having the formula (I-d) is characterized in a high peak at a diffraction angle (2θ) of 16.3° and relatively high peaks at diffraction angles (2θ) of 19.7°, 20.1° and 21.4° in an X-ray diffraction diagram by the Cu-Kα beam [the crystal is referred to as type (I-d)-1 crystal hereinafter].

The crystal of the fluoran compound represented by the formula (I) is prepared by precipiating in the form of crystal and separating from a solution of an organic polar solvent having a moisture content of 50% by weight or less.

Alternatively, the crystal of the fluoran compound represented by the formula (I) is prepared by dissolving the amorphous fluoran compound represented by the formula (I) in an organic polar solvent having a moisture content of 50% by weight or less and successively precipitating and isolating in the crystalline form.

When the moisture content of the organic polar solvent exceeds 50% by weight in the preparation of the crystal, the fluoran compound of the formula (I) unfavorably precipitates in an amorphous state in some cases.

The preparation process will hereinafter be illustrated in detail on the type (I-a)-1 and (I-a)-2 crystals of the fluoran compound having the formula (I-a), the type (I-b)-1 crystal of the fluoran compound having the formula (I-b), the type (I-c)-1 crystal of the fluran compound having the formula (I-c), and the type (I-d)-1 crystal of the fluoran compound having the formula (I-d). The type (I-a)-1 crystal of the fluoran compound having the formula (I-a):

As will be illustrated below in detail, the fluoran compound having the formula (I-a) forms a crystalline solvate by precipitating from a solution of an aromatic hydrocarbon-based solvent such as benzene, toluene, o-xylene and anisole. The type (I-a)-1 crystal can be prepared by treating the crystalline solvate thus obtained. That is, the crystalline solvate of the fluoran compound having the formula (I-a) is not dissolved but suspended in an organic polar solvent such as methanol which has a moisture content of 50% by weight or less in the vicinity of room temperature, i.e., from 0° to 40° C., and then suspended matter is separated to prepare the type (I-a)-1 crystal favorably.

The type (I-a)-2 crystal of the fluoran compound having the formula (I-a):

The type (I-a)-2 crystal is prepared by precipitating the crystal from a solution containing the fluoran compound of the formula (I-a) in an organic polar solvent having a moisture content of 50% by weight or less, and by isolating the precipitated crystal.

The type (I-a)-2 crystal can also be prepared by dissolving the amorphous fluoran compound of the formula (I-a) in an organic polar solvent having a moisture content of 50% by weight or less, and successively by precipitating and isolating the fluoran compound in the crystalline form.

Exemplary organic polar solvents which can be used include alcohol-based solvents such as methanol, ethanol, isopropanol and n-butanol; ketone-based solvents such as acetone and methyl ethyl ketone, acetonitrile and dimethylformamide. These organic polar solvents may contain aromatic hydrocarbon-based solvents such as benzene, toluene and xylene. However, too high content of the aromatic hydrocarbon-based solvent causes precipitation of the crystalline solvate and contaminates the desired type (I-a)-2 crystal. Consequently, the content of the aromatic hydrocarbon-based solvent is preferably 10% by weight or less of the organic polar solvent.

Alternatively, the type (I-a)-2 crystal can be prepared by dissolving the crystalline solvate consisting of the fluoran compound of the formula (I-a) in an organic polar solvent having a moisture content of 50% by weight or less and successively by precipitating the crystal in a temperature range of from room temperature to the boiling point of the solvent. The organic polar solvent used includes, for example, alcohol-based solvents such as methanol, ethanol, isopropanol and n-butanol; ketone-based solvents such as acetone and methyl ethyl ketone; acetonitrile and dimethylformamide.

Type (I-b)-1 crystal of the fluoran compound having the formula (I-b):

The type (I-b)-1 crystal is prepared by precipitating the crystal from a solution containing the fluoran compound of the formula (I-b) in an organic polar solvent having a moisture content of 50% by weight or less, and by isolating the precipitated crystal.

The type (I-b)-1 crystal can also be prepared by dissolving the amorphous fluoran compound of the formula (I-b) in an organic polar solvent having a moisture content of 50% by weight or less, and successively by precipitating and isolating the fluoran compound in the crystalline form.

Exemplary organic polar solvents which can be used include alcohol-based solvents such as methanol, ethanol, isopropanol and n-butanol; ketone-based solvents such as acetone and methyl ethyl ketone; acetonitrile and dimethylformamide. These organic polar solvents having a moisture content of 50% by weight or less may contain aromatic hydrocarbon-based solvents such as benzene, toluene and xylene. However, too high content of the aromatic hydrocarbon-based solvents causes precipitation of the crystalline solvate and contaminates the desired type (I-b)-1 crystal. Consequently, the content of the aromatic by hydrocarbon-based solvent is preferably 10% by weight or less of the organic polar solvent.

Alternatively, the type (I-b)-1 crystal is prepared by dissolving a crystalline solvate consisting of the fluoran compound of the formula (I-b) and an aromatic hydrocarbon-base solvent such as benzene, toluene, o-xylene, m-xylene, p-xylene, anisole and ethylbenzene in an organic polar solvent having a moisture content of 50% by weight or less, for example, alcohol-based solvents such as methanol, ethanol, isopropanol, and butanol. Ketone-based solvents such as acetone and methyl ethyl ketone, ester-based solvents such as ethyl acetate; acetonitrile and dimethylformamide, and successively by precipitating the crystal in a temperature range of from room temperature to the boiling point of the organic polar solvent.

Type (I-c)-1 crystal of the fluoran compound having the formula (I-c):

The type (I-c)-1 crystal is prepared by precipitating the crystal from a solution containing the fluoran compound of the formula (I-c) in an organic polar solvent having a moisture content of 50% by weight or less, and by isolating the precipitated crystal.

The type (I-c)-1 crystal can also be prepared by dissolving the amorphous compound of the formula (I-c) in an organic polar solvent having a moisture content of 50% by weight or less, and successively by precipitating and isolating the fluoran compound in the crystalline form.

Exemplary organic polar solvents which can be used include alcohol-based solvent such as methanol, ethanol, isopropanol and n-butanol; ketone-based solvents such as acetone and methyl ethyl ketone; acetonitrile and dimethylformamide. These organic polar solvents having a moisture content of 50% by weight or less may contain aromatic hydrocarbon-based solvents such as benzene, toluene and xylene. However, too high content of the aromatic hydrocarbon-based solvents causes precipitation of the crystalline solvate and contaminates the desired type (I-c)-1 crystal. Consequently, the content of the aromatic hydrocarbon-based solvent is preferably 10% by weight or less of the organic polar solvent.

Alternatively, the type (I-c)-1 crystal is prepared by dissolving a crystalline solvate consisting of the fluoran compound of the formula (I-c) and an aromatic hydrocarbon-based solvent such as benzene, toluene and anisole in an organic polar solvent having a moisture content of 50% by weight or less, for example, alcohol-based solvents such as methanol, ethanol, isopropanol and butanol; ketone-based solvents such as acetone and methyl ethyl ketone, ester-based solvents such as ethyl acetate; acetonitrile and dimethylformamide, and successively by precipitating the crystal in a temperature range of from room temperature to the boiling point of the organic polar solvent.

The above organic polar solvent can be used for preparing the above type (I-a)-2 crystal, type (I-b)-1 crystal and type (I-c)-1 crystal. Particularly preferred organic polar solvents are alcohol-based solvents such as methanol, ethanol, isopropanol and n-butanol; and ketone-based solvents such as acetone and methyl ethyl ketone and acetonitrile.

Type (I-d)-1 crystal of the fluoran compound having the formula (I-d):

The type (I-d)-1 crystal is prepared by precipitating the crystal from a solution containing the fluoran compound of the formula (I-d) in an organic polar solvent having a moisture content of 50% by weight or less, and by isolating the precipitated crystal.

The type (I-d)-1 crystal can also be prepared by dissolving the amorphous fluoran compound of the formula (I-d) in an organic polar solvent having a moisture content of 50% by weight or less, and successively by precipitating and isolating the fluoran compound in the form of crystal.

Exemplary organic polar solvents which can be used include alcohol-based solvents such as methanol, ethanol and n-butanol; ketone-based solvents such as methyl isobutyl ketone; acetonitrile and dimethylformamide.

However, the use of isopropanol, acetone and methyl ethyl ketone is unfavorable because of precipitation of a crystalline solvate consisting of the fluoran compound having the formula (I-d) and isopropanol, acetone or methyl ethyl ketone. These organic polar solvents may contain aromatic hydrocarbon-based solvents such as benzene, toluene and xylene. However, too high content of the aromatic hydrocarbon-based solvents causes precipitation of the crystalline solvate and contaminates the desired type (I-d)-1 crystal. Consequently, the content of the aromatic hydrocarbon-based solvent is preferably 10% by weight or less of the organic polar solvent.

Alternatively, the type (I-d)-1 crystal is prepared by dissolving a crystalline solvate consisting of the fluoran compound of the formula (I-d) and an aromatic hydrocarbon-based, alcohol-based or ketone-based solvent such as benzene, toluene, isopropanol, acetone or methyl ethyl ketone, in an organic polar solvent having a moisture content of 50% by weight or less, for example, alcohol-based solvents such as methanol, ethanol and n-butanol; ketone-based solvents such as methyl isobutyl ketone; ester-based solvents such as ethyl acetate; and acetonitrile and dimethylformamide, and by successively precipitating the crystal in a temperature range of room temperature to the boiling point of the organic polar solvent.

The above organic solvents can be used for preparing the above type (I-d)-1 crystal, and particularly preferred organic polar solvents are alcohol-based solvents such as methanol, ethanol and n-butanol except isopropanol; and ketone based solvents such as methyl isobutyl ketone except acetone and methyl ethyl ketone and acetonitrile.

In preparing the crystal of the fluoran compound represented by the formula (I), the amount of the organic polar solvent having a moisture content of 50% by weight or less is preferably 0.4 weight or more per weight of the fluoran compound represented by the formula (I).

There is no particular problem even though the solvent is used in a large amount. On the other hand, it is sometimes required to carry out procedures such as concentration in order to precipitate the crystal. Hence, the amount of the solvent used is usually from 0.4 to 100 weight, preferably from 0.5 to 50 weight per weight of the fluoran compound represented by the formula (I).

The crystal is precipitated from the organic solvent having a moisture content of 50% by weight or less in a temperature range of from the room temperature to the boiling point of the solvent, and thereafter separated by a known process such as filtration and dried at a temperature lower than the melting point of the crystal to obtain the desired crystal of the fluoran compound represented by the formula (I).

As mentioned above, when the fluoran compound of the formula (I) is separated in the crystalline form from the aromatic hydrocarbon-based solvent, alcohol-based solvent or ketone-based solvent, the resulting crystal is surprisingly a crystalline solvate wherein the aromatic hydrocarbon-based solvent, alcohol-based solvent or ketone-based solvent becomes incorporated into the fluoran compound represented by the formula (I).

Exemplary aromatic hydrocarbon-based solvent, alcohol-based solvent and ketone-based solvent which can form the crystalline solvate include, for example, benzene, toluene, xylene, ethylbenzene, anisole, chlorobenzene, isopropanol, acetone and methyl ethyl ketone.

Particularly, the fluoran compound of the formula (I-a) forms the crystalline solvate preferably with benzene, toluene, o-xylene and anisole.

The fluoran compound of the formula (I-b) preferably forms the crystalline solvate with benzene, toluene, o-xylene, m-xylene, p-xylene, ethylbenzene, anisole and chlorobenzene.

The fluoran compound of the formula (I-c) preferably forms the crystalline solvate with benzene, toluene and anisole.

The fluoran compound of the formula (I-d) preferably forms the crystalline solvate with benzene, toluene, isopropanol, acetone and methyl ethyl ketone.

On the crystalline solvate of the fluoran compound represented by the formula (I), the mole ratio of the constituents, i.e., the mole ratio of the fluoran compound to the aromatic hydrocarbon-based solvent, alcohol-based solvent or ketone-based solvent, is a specific and constant value depending upon the kind of the crystalline solvate.

The value can be obtained by conducting $^1$H-NMR measurement of the crystalline solvate and calculating the integral ratio of the specific proton signal of the fluoran compound to the specific proton signal of the aromatic hydrocarbon-based solvent, alcohol-based solvent or ketone-based solvent. The mole ratio can also be confirmed by other analytical methods such as elementary analysis.

For example, when $^1$H-NMR of the crystalline solvate of the fluoran compound having the formula (I-a) consisting of the fluoran compound of the formula (I-a) and toluene is measured in DMSO-$d_6$, a signal of a methyl group at the position 6 on the fluoran compound is observed at δ2.21 ppm and a signal of a methyl group on toluene is observed at δ2.29 ppm. The integral ratio of these signals is about 2:1. Hence, the ratio of the constituents, i.e., the mole ratio of the fluoran compound to toluene is about 2:1.

Similarly, in the crystalline solvate consisting of the fluoran compound of the formula (I-b) and m-xylene, the mole ratio of the fluoran compound to m-xylene is about 2:1.

In the crystalline solvate consisting of the fluoran compound of the formula (I-b) and anisole, the mole ratio of the fluoran compound to anisole is about 2:1.

In the crystalline solvate consisting of the fluoran compound of the formula (I-c) and toluene, the mole ratio of the fluoran compound to toluene, is about 2:1.

In the crystalline consisting of the fluoran compound of the formula (I-d) and toluene, the mole ratio of the fluoran compound to toluene is about 2:1.

In the crystalline solvate consisting of the fluoran compound of the formula (I-d) and isopropanol, the mole ratio of the fluoran compound to isopropanol is about 2:1.

In the crystalline solvate consisting of the fluoran compound of the formula (I-d) and acetone, the mole ratio the fluoran compound to acetone is about 2:1.

When the crystalline solvate of the fluoran compound represented by the formula (I) is measured by a powder X-ray diffraction analysis using the Cu-Kα beam, the X-ray diffraction diagram obtained exhibits characteristic peaks at each specific diffraction angle (2θ) depending upon the difference of the fluoran compound and the difference of the aromatic hydrocarbon-bases solvent, alcohol-based solvent or ketone-based solvent. Consequently, each crystalline solvate is proved to have an intrinsic crystalline form which is thought to incorporate each solvent into the crystal lattice.

Figure 3:
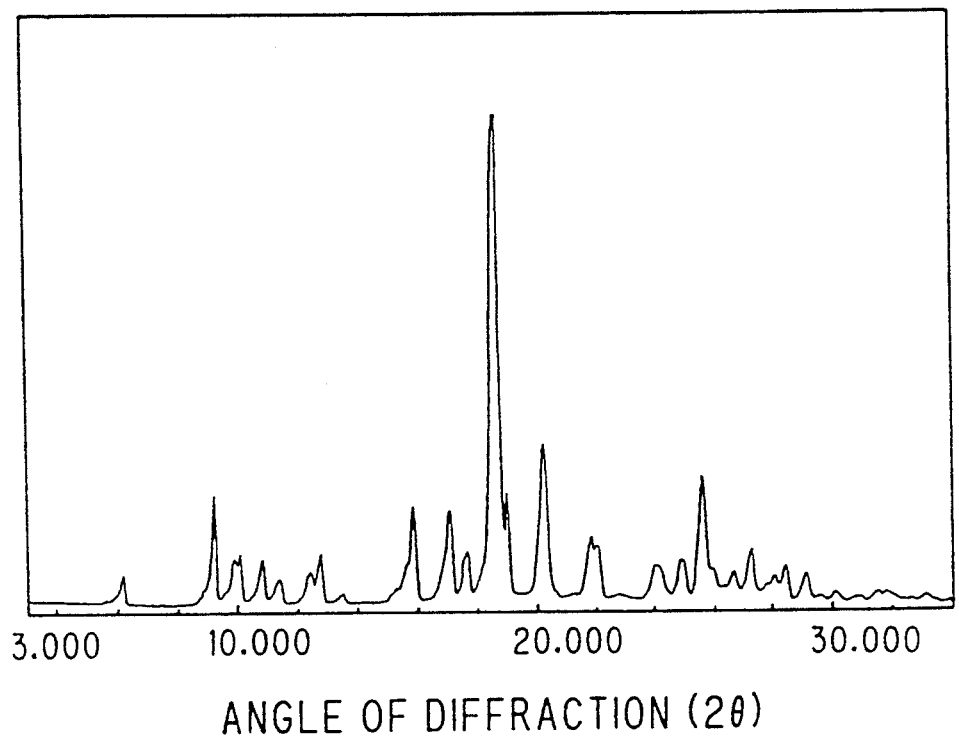
FIG. 3: Type (I-a)-3 Crystal.

FIG. 3 illustrates a powder X-ray diffraction diagram of the crystalline solvate consisting of the fluoran compound of the formula (I-a) and benzene (hereinafter reference to as type (I-a)-3 crystal). The crystal exhibits a high peak at a diffraction angle (2θ) of 18.7° and a relatively high peak at 20.3°.

Figure 4:
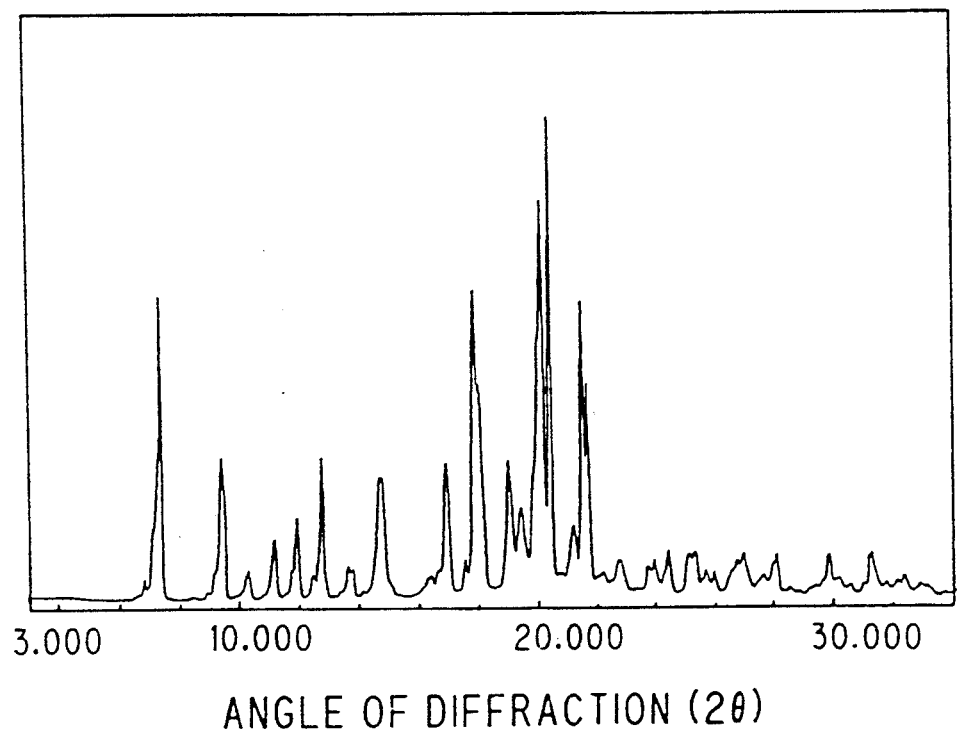
FIG. 4: Type (I-a)-4 Crystal.

FIG. 4 illustrates a powder X-ray diffraction diagram of the crystalline solvate consisting of the fluoran compound of the formula (I-a) and toluene (hereinafter referred to as type (I-a)-4 crystal). The crystal exhibits high peaks at a diffraction angle (2θ) of 20.1° and 20.4°, and relatively high peaks at 7.4°, 17.8° and 21.5°.

Figure 5:
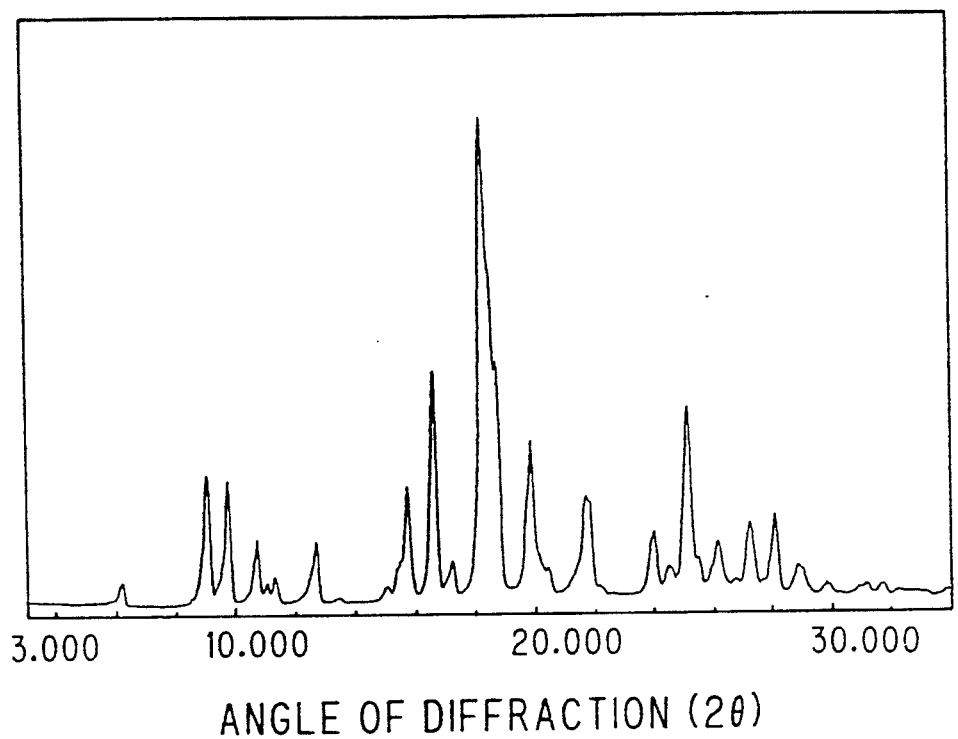
FIG. 5: Type (I-a)-5 Crystal.

FIG. 5 illustrates a powder X-ray diffraction diagram of the crystalline solvate consisting of the fluoran compound of the formula (I-a) and o-xylene (hereinafter referred to as type (I-a)-5 crystal). The crystal exhibits a high peak at a diffraction angle (2θ) of 18.4° and relatively high peaks at 16.7°, 18.8° and 25.2°.

Figure 6:
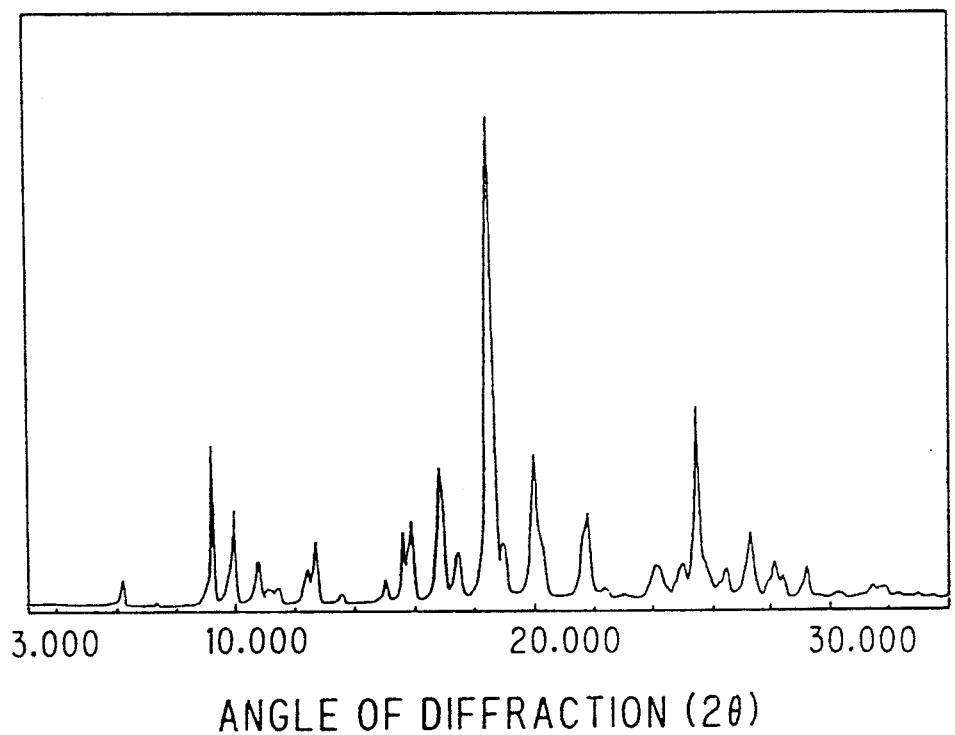
FIG. 6: Type (I-a)-6 Crystal.

FIG. 6 illustrates a powder X-ray diffraction diagram of the crystalline solvate consisting of the fluoran compound of the formula (I-a) and anisole (hereinafter referred to as type (I-a)-6 crystal). The crystal exhibits a high peak at a diffraction angle (2θ) of 18.7°, and relatively high peaks at 9.3°, 17.0°, 20.1° and 25.6°.

Figure 8:
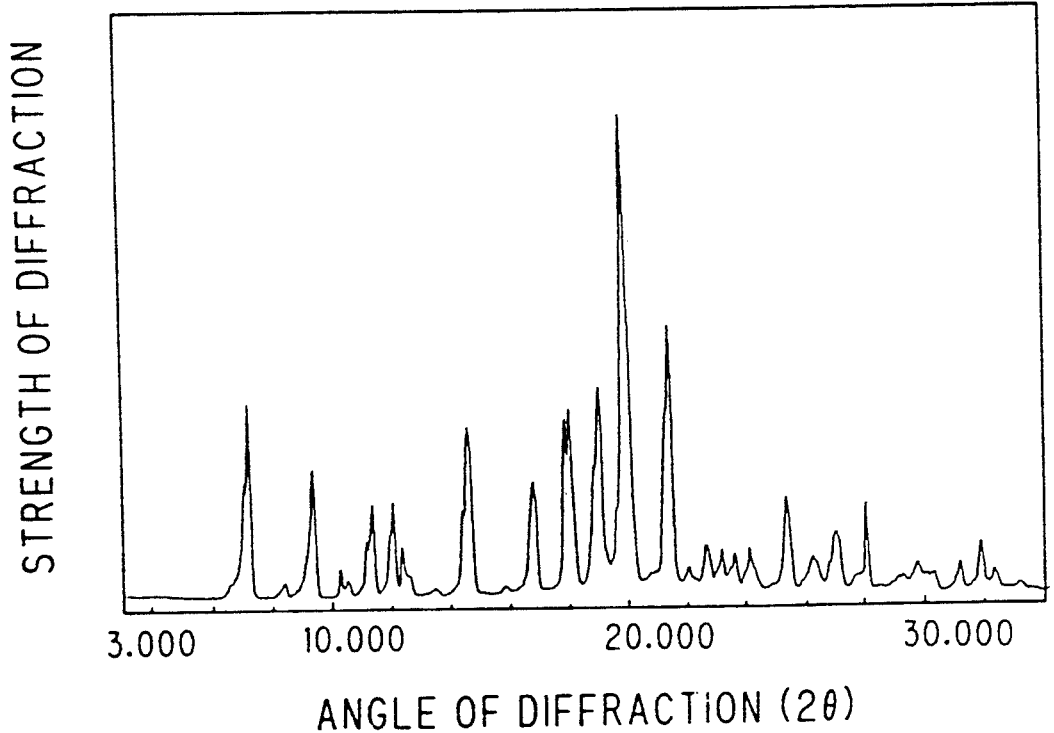
FIG. 8: Type (I-b)-2 Crystal.

FIG. 8 illustrates a powder X-ray diffraction diagram of the crystalline solvate consisting of the fluoran compound of the formula (I-b) and benzene (hereinafter referred to as type (I-b)-2 crystal). The crystal exhibits a high peak at a diffraction angle (2θ) of 20.0° and a relatively high peak at 21.5°.

Figure 9:
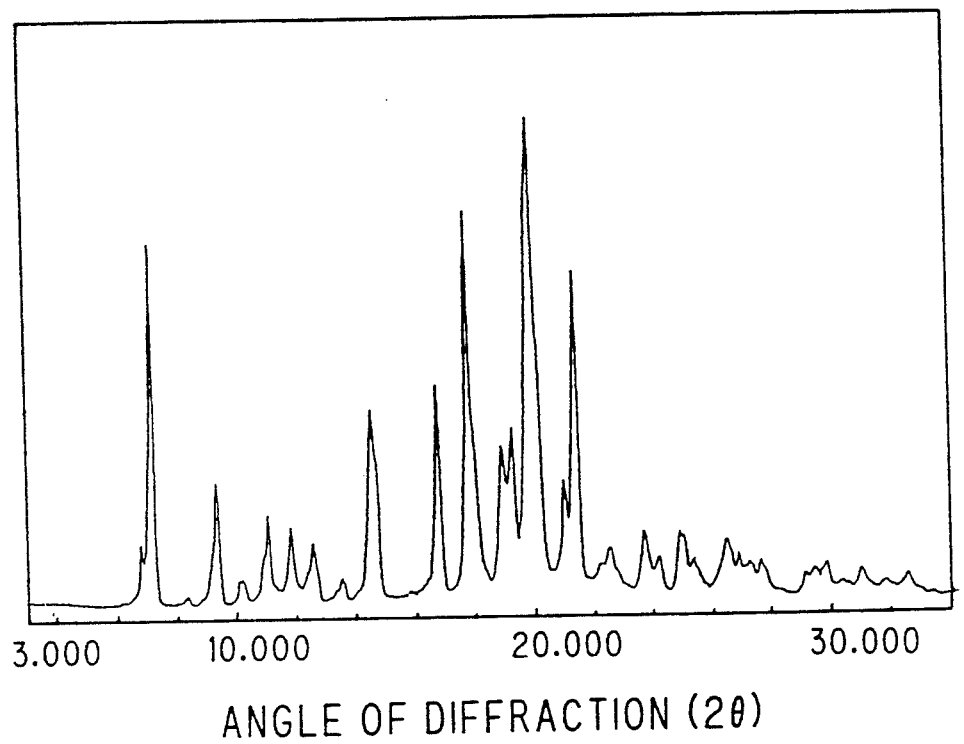
FIG. 9: Type (I-b)-3 Crystal.

FIG. 9 illustrates a powder X-ray diffraction diagram of the crystalline solvate consisting of the fluoran compound of the formula (I-b) and toluene (hereinafter referred to as type (I-b)-3 crystal). The crystal exhibits a high peak at a diffraction angle (2θ) of 20.0°, and relatively high peaks at 7.2°, 17.8°, 20.1° and 21.4°.

Figure 10:
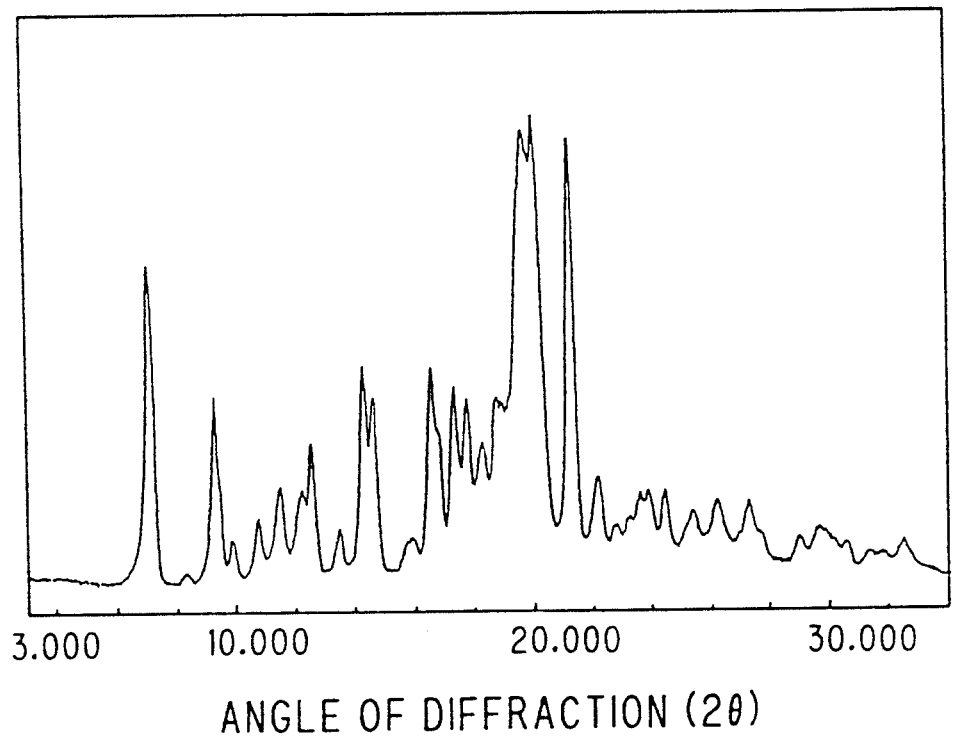
FIG. 10: Type (I-b)-4 Crystal.

FIG. 10 illustrates a powder X-ray diffraction diagram of the crystalline solvate consisting of the fluoran compound of the formula (I-b) and o-xylene (hereinafter referred to as type (I-b)-4 crystal). The crystal exhibits high peaks at a diffraction angle (2θ) of 19.6°, 19.9°, 20.2° and 21.4°, and a relatively high peak at 7.2°.

Figure 11:
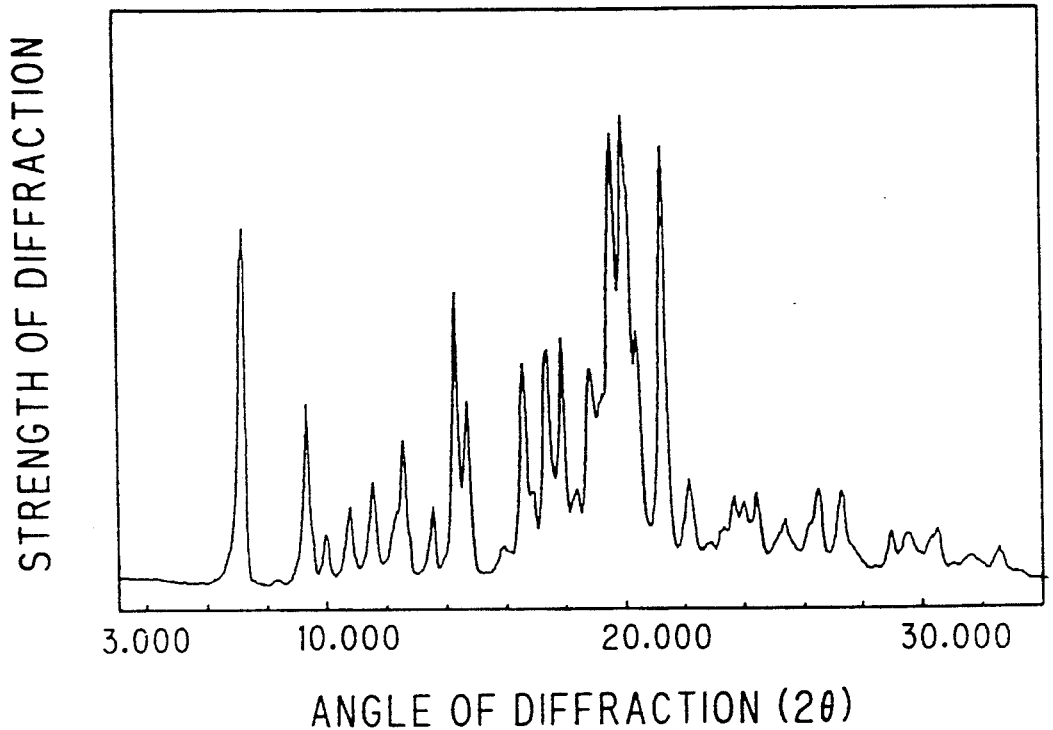
FIG. 11: Type (I-b)-5 Crystal.

FIG. 11 illustrates a powder X-ray diffraction diagram of the crystalline solvate consisting of the fluoran compound of the formula (I-b) and m-xylene (hereinafter referred to as type (I-b)-5 crystal). The crystal exhibits high peaks at a diffraction angle (2θ) of 19.6°, 20.0° and 21.3°, and a relatively high peak at 7.2°.

Figure 12:
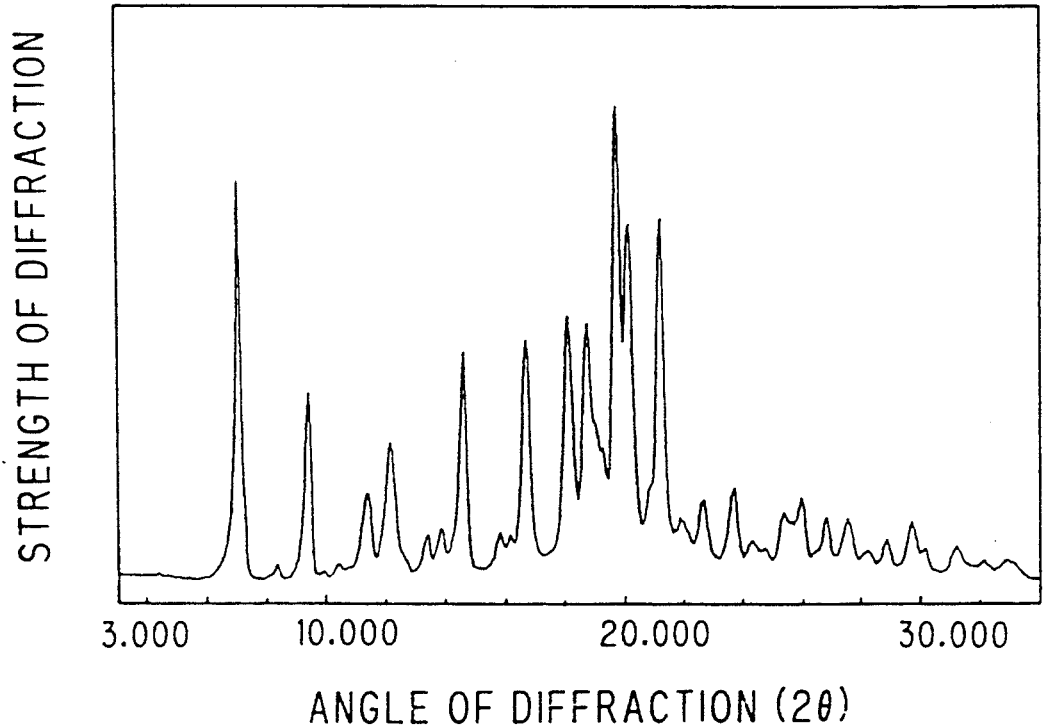
FIG. 12: Type (I-b)-6 Crystal.

FIG. 12 illustrates a powder X-ray diffraction diagram of the crystalline solvate consisting of the fluoran compound of the formula (I-b) and p-xylene (hereinafter referred to as type (I-b)-6 crystal). The crystal exhibits a high peak at a diffraction angle (2θ) of 19.9°, and relatively high peaks at 7.1°, 20.3° and 21.4°.

Figure 13:
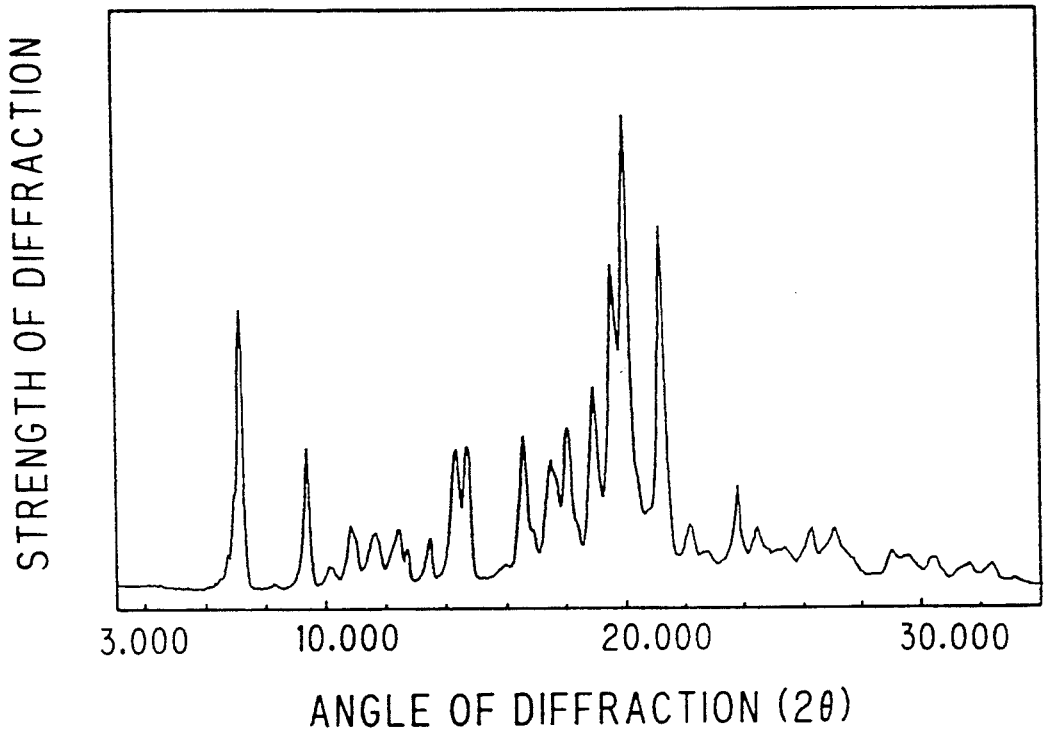
FIG. 13: Type (I-b)-7 Crystal.

FIG. 13 illustrates a powder X-ray diffraction diagram of the crystalline solvate consisting of the fluoran compound of the formula (I-b) and ethylbenzene (hereinafter referred to as type (I-b)-7 crystal). The crystal exhibits a high peak at a diffraction angle (2θ) of 20.1°, and relatively high peaks at 7.2°, 19.6° and 21.3°.

Figure 14:
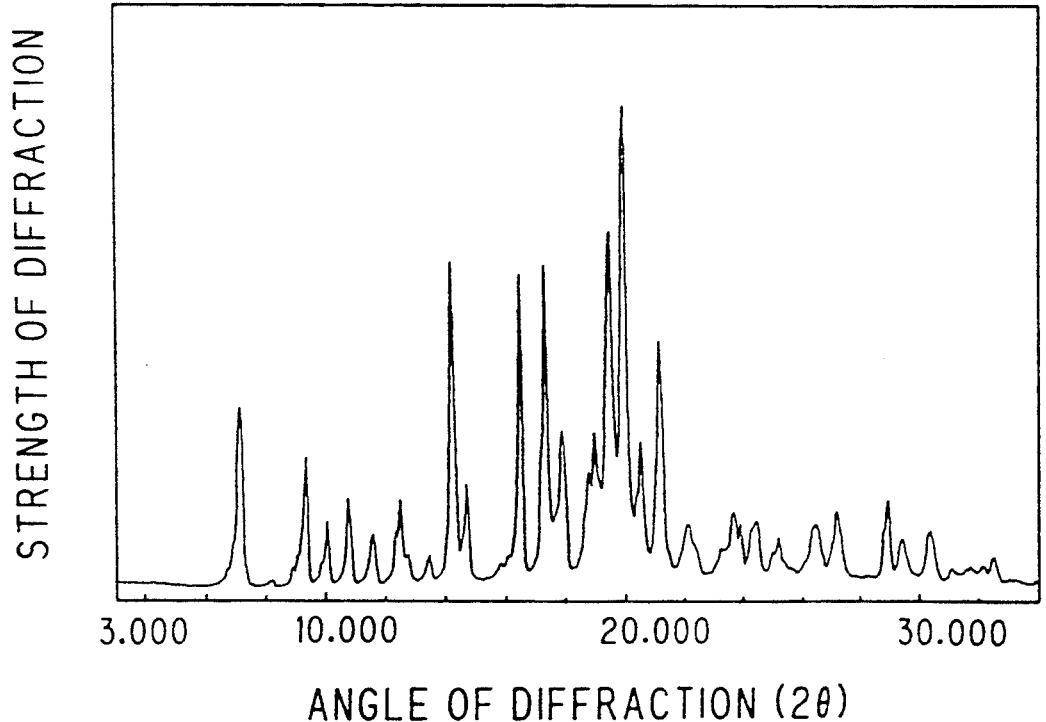
FIG. 14: Type (I-b)-8 Crystal.

FIG. 14 illustrates a powder X-ray diffraction diagram of the crystalline solvate consisting of the fluoran compound of the formula (I-b) and anisole (hereinafter referred to as type (I-b)-8 crystal). The crystal exhibits a high peak at a diffraction angle (2θ) of 20.1°, and relatively high peaks at 14.3°, 16.6°, 17.5° and 19.6°.

Figure 15:
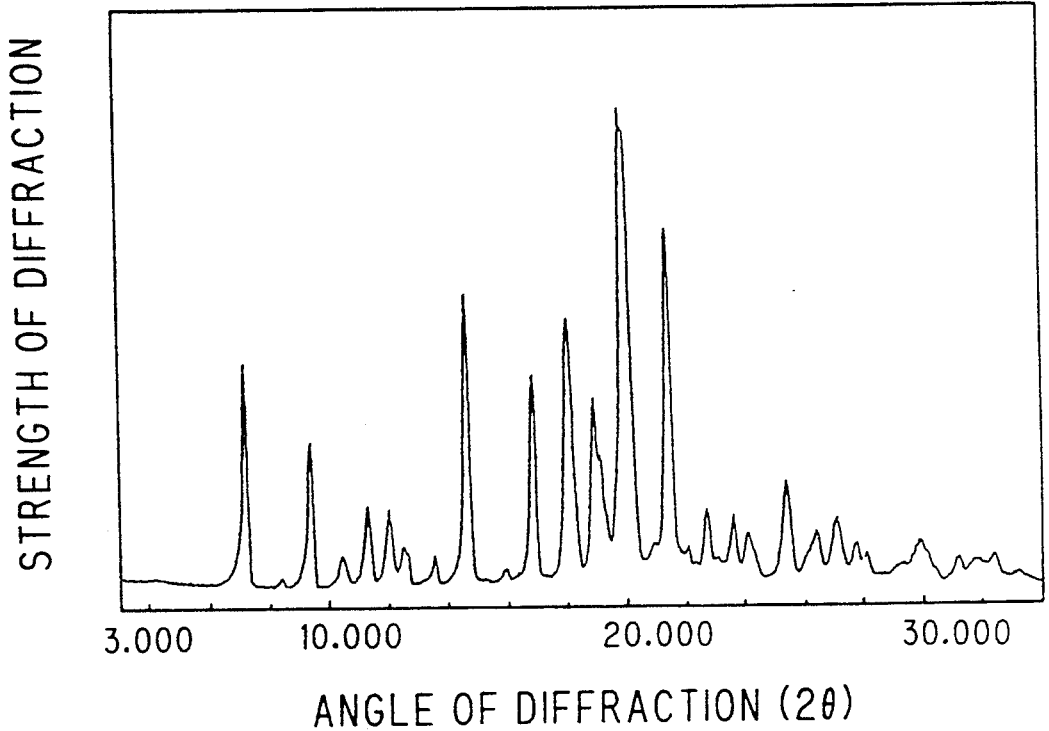
FIG. 15: Type (I-b)-9 Crystal.

FIG. 15 illustrates a powder X-ray diffraction diagram of the crystalline solvate consisting of the fluoran compound of the formula (I-b) and chlorobenzene (hereinafter referred to as type (I-b)-9 crystal). The crystal exhibits a high peak at a diffraction angle (2θ) of 20.0°, and relatively high peaks at 14.6°, 18.1° and 21.5°.

Figure 17:
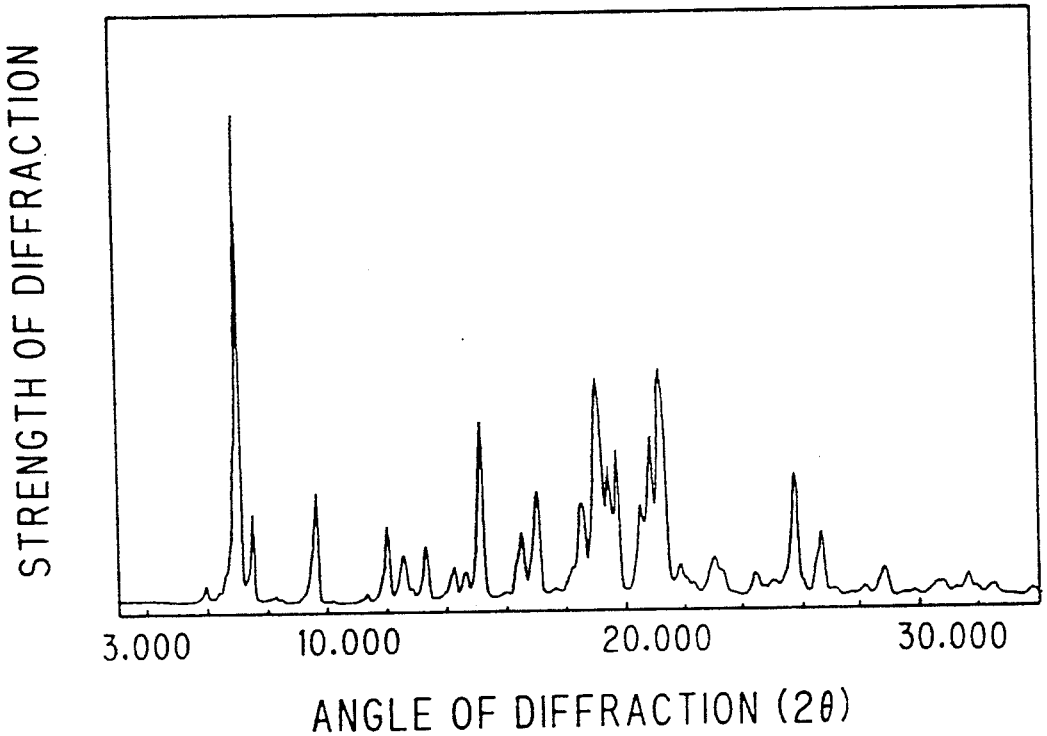
FIG. 17: Type (I-c)-2 Crystal.

FIG. 17 illustrates a powder X-ray diffraction diagram of the crystalline solvate consisting of the fluoran compound of the formula (I-c) and benzene (hereinafter referred to as type (I-c)-2 crystal). The crystal exhibits a high peak at a diffraction angle (2θ) of 7.1°.

Figure 18:
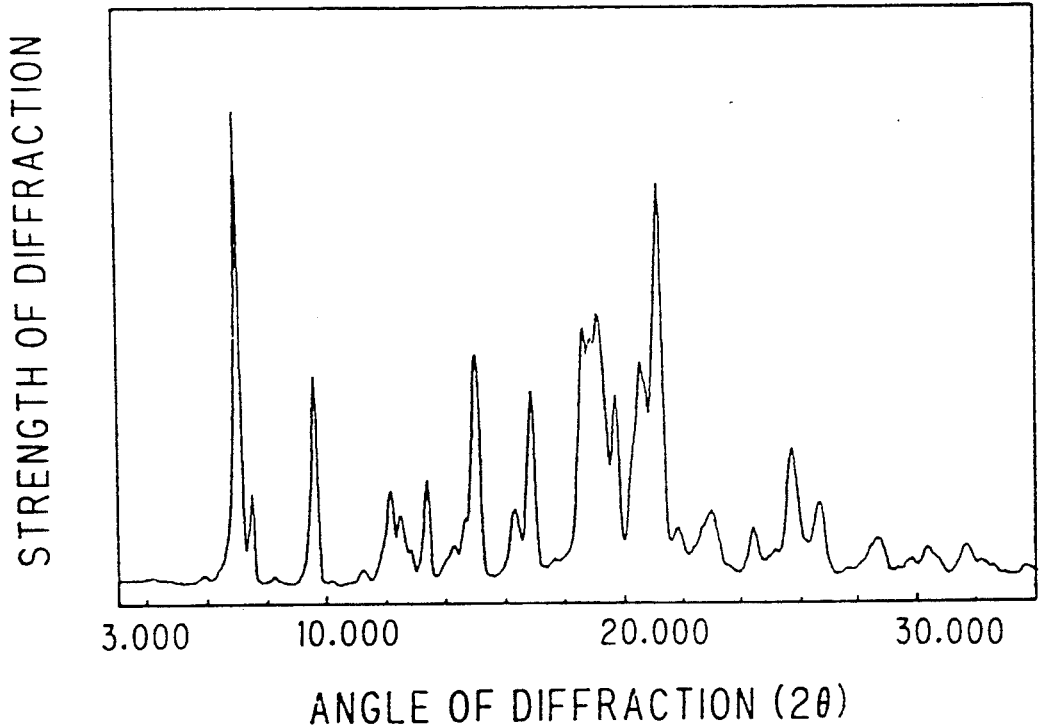
FIG. 18: Type (I-c)-3 Crystal.

FIG. 18 illustrates a powder X-ray diffraction diagram of the crystalline solvate consisting of the fluoran compound of the formula (I-c) and toluene [hereinafter referred to as type (I-c)-3 crystal]. The crystal exhibits a high peak at a diffraction angle (2θ) of 7.1° and 21.4°.

Figure 19:
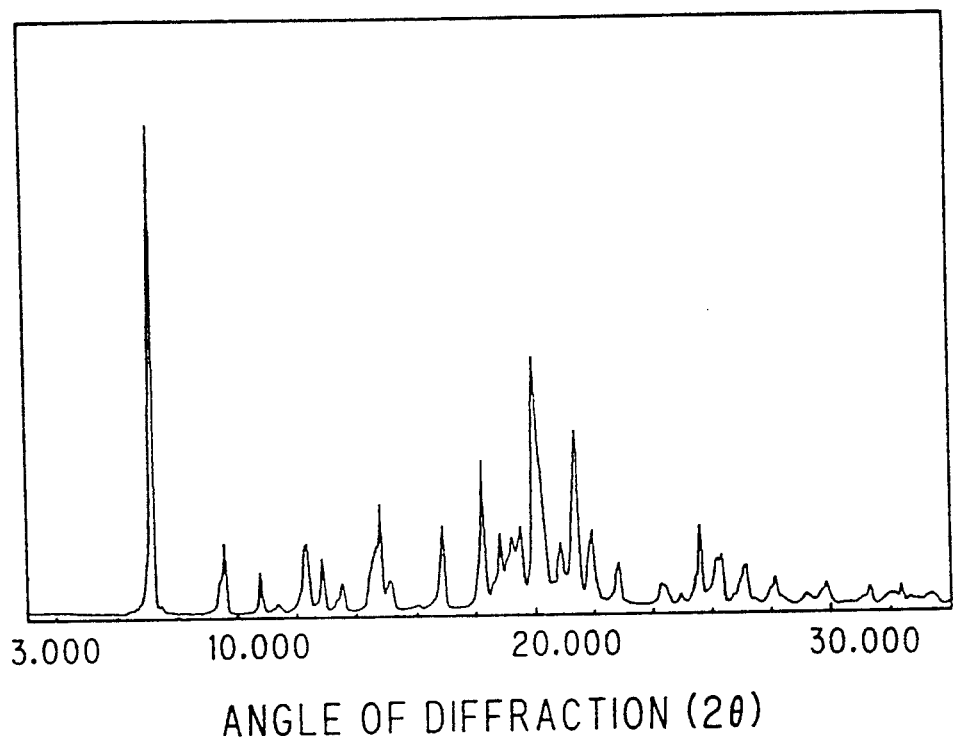
FIG. 19: Type (I-c)-4 Crystal.

FIG. 19 illustrates a powder X-ray diffraction diagram of the crystalline solvate consisting of the fluoran compound of the formula (I-c) and anisole (hereinafter referred to as type (I-c)-4 crystal). The crystal exhibits a high peak at a diffraction angle (2θ) of 7.2°.

Figure 21:
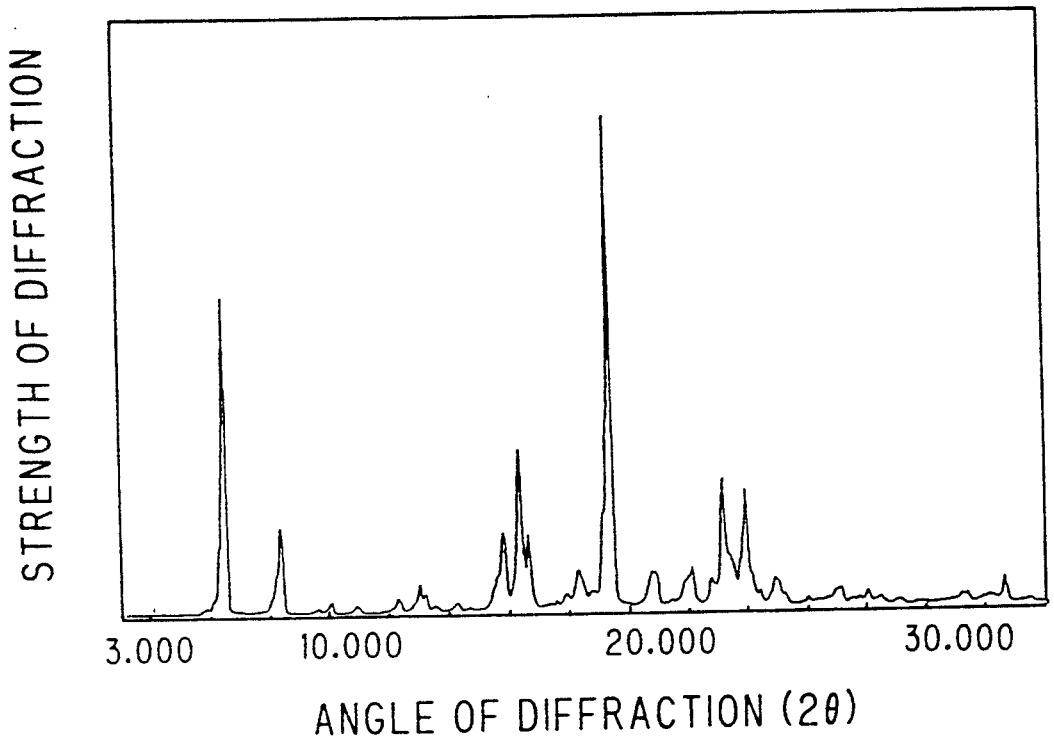
FIG. 21: Type (I-d)-2 Crystal.

FIG. 21 illustrates a powder X-ray diffraction diagram of the crystalline solvate consisting of the fluoran compound of the formula (I-d) and benzene [hereinafter referred to as type (I-d)-2 crystal]. The crystal exhibits a high peak at a diffraction angle (2θ) of 19.4°, and relatively high peaks at 6.5°.

Figure 22:
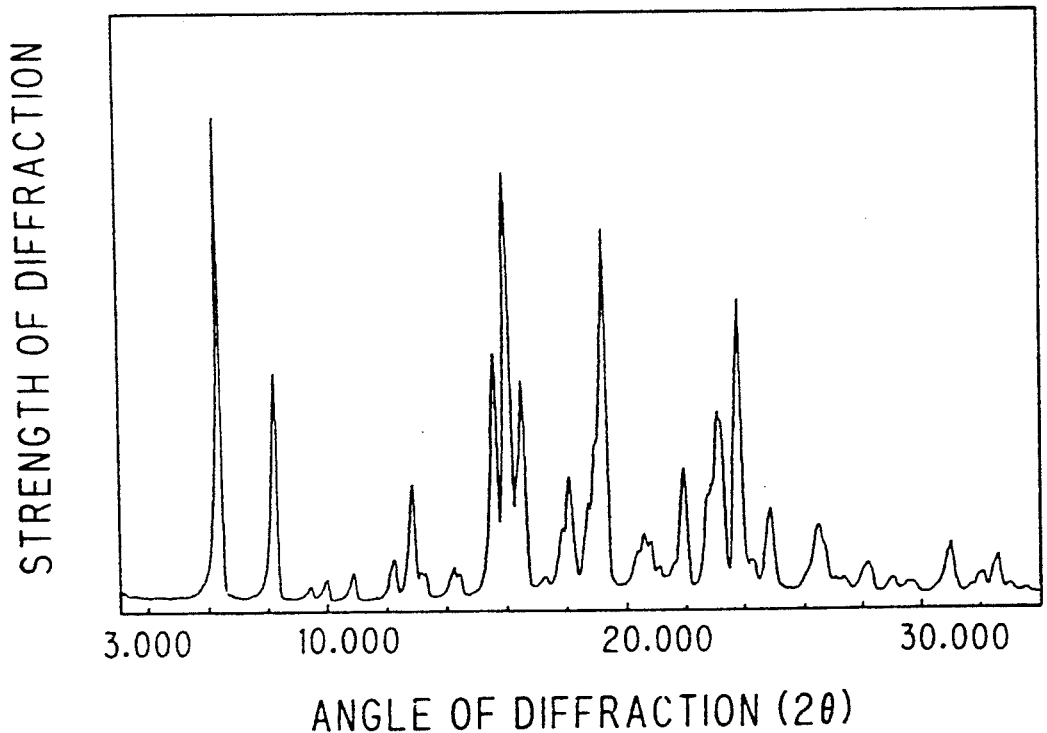
FIG. 22: Type (I-d)-3 Crystal.

FIG. 22 illustrates a powder X-ray diffraction diagram of the crystalline solvate consisting of the fluoran compound of the formula (I-d) and toluene (hereinafter referred to as type (I-d)-3 crystal). The crystal exhibits a high peak at a diffraction angle (2θ) of 6.4°, 16.1° and 19.3°, and a relatively high peak at 23.8°.

Figure 23:
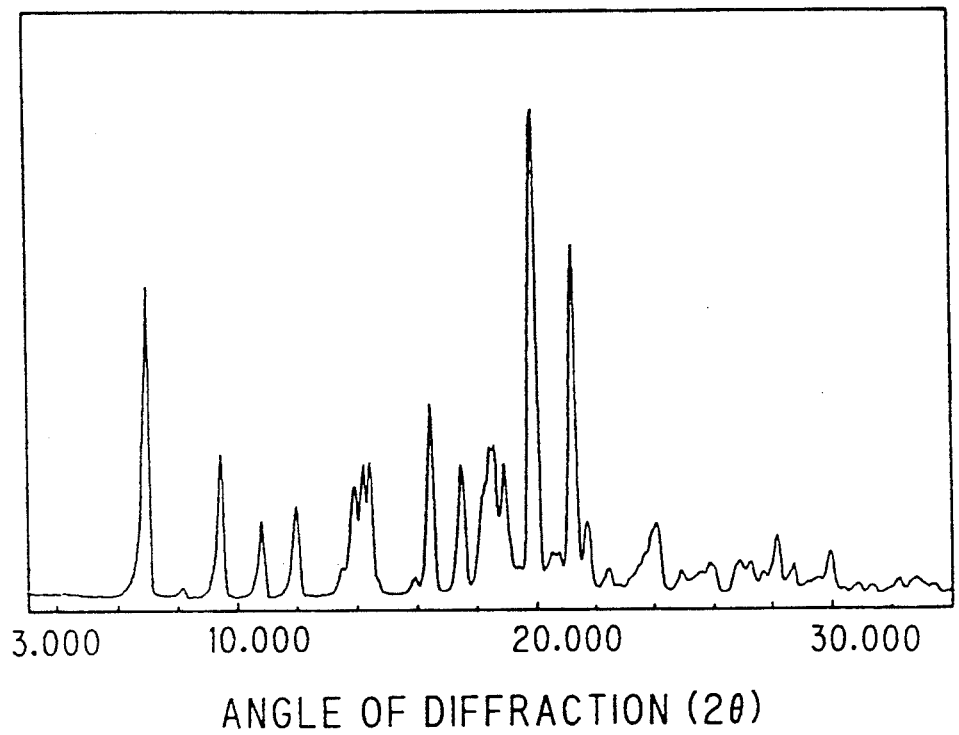
FIG. 23: Type (I-d)-4 Crystal.

FIG. 23 illustrates a powder X-ray diffraction diagram of the crystalline solvate consisting of the fluoran compound of the formula (I-d) and isopropanol(-hereinafter referred to as type (I-d)-4 crystal). The crystal exhibits a high peak at a diffraction angle (2θ) of 20.0°, and relatively high peaks at 7.0° and 21.3°.

Figure 24:
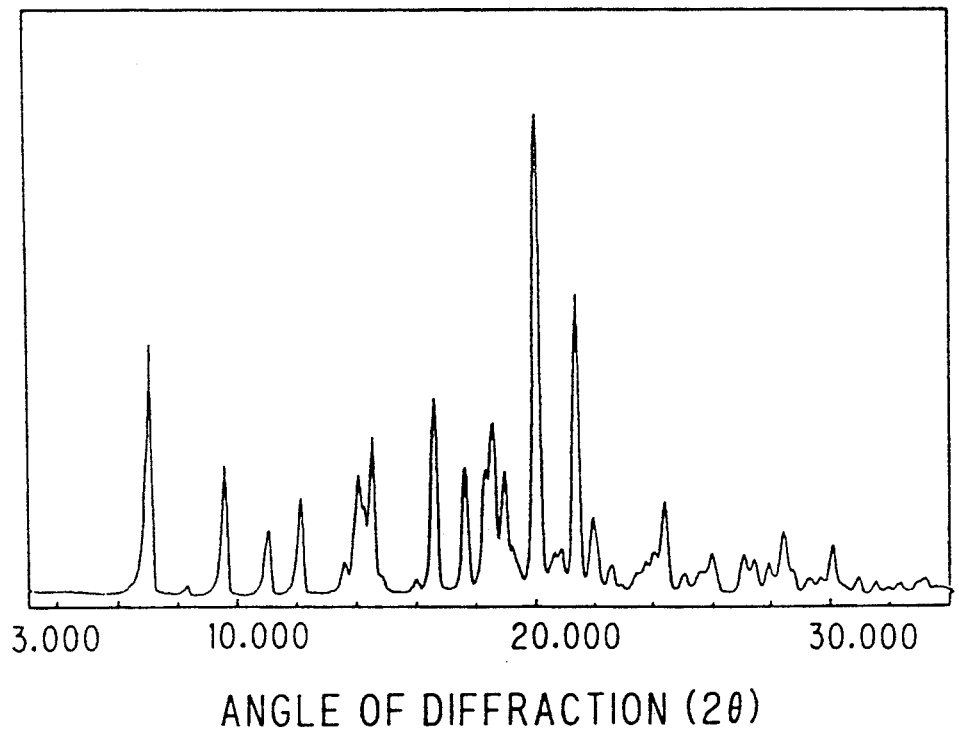
FIG. 24: Type (I-d)-5 Crystal.

FIG. 24 illustrates a powder X-ray diffraction diagram of the crystalline solvate consisting of the fluoran compound of the formula (I-d) and acetone (hereinafter referred to as type (I-d)-5 crystal). The crystal exhibits a high peak at a diffraction angle (2θ) of 20.1°, and relatively high peaks at 7.1° and 21.4°.

Figure 25:
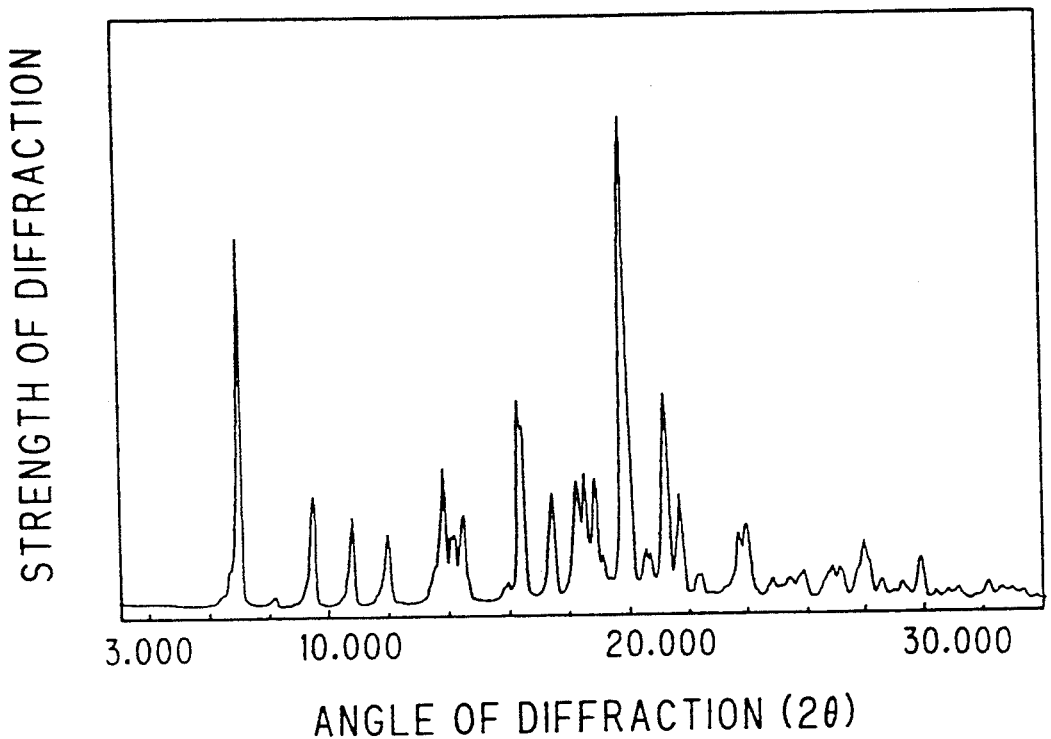
FIG. 25: Type (I-d)-6 Crystal.

FIG. 25 illustrates a powder X-ray diffraction diagram of the crystalline solvate consisting of the fluoran compound of the formula (I-d) and methyl ethyl (hereinafter referred to as type (I-d)-6 crystal). The crystal exhibits 2 high peak at 20.0° and relatively high peak at 7.0°.

Each powder X-ray diffraction diagram of the crystal and the crystalline solvate was measured by using the Cu-Kα beam. Errors of about 35 0.2° can be permitted in the indication of each diffraction angle (2θ).

The crystalline solvate of the fluoran compound represented by the formula (I) is prepared by dissolving the crystal of the amorphous state of the compound represented by the formula (I) in an aromatic hydrocarbon-based, alcohol-based or ketone-based solvent, for example, benzene, toluene, xylene, anisole, ethylbenzene, chlorobenzene, isopropanol, acetone or methyl ethyl ketone, and by successively precipitating and isolating the solvate.

The crystalline solvate of the fluoran compound having the formula (I-a) can be favorably prepared by particularly dissolving the compound in benzene, toluene, o-xylene or anisole, and successively precipitating and isolating the solvate.

The crystalline solvate of the fluoran compound having the formula (I-b) can be favorably prepared by particularly dissolving the compound in benzene, toluene, o-xylene, m-xylene, p-xylene, ethylbenzene, anisole or chlorobenzene, and successively precipitating and isolating the solvate.

The crystalline solvate of the fluoran compound having the formula (I-c) can be favorably prepared by particularly dissolving the compound in benzene, toluene or anisole, and successively precipitating and isolating the solvate.

The crystalline solvate of the fluoran compound having the formula (I-d) can be favorably prepared by particularly dissolving the compound in benzene, toluene, isopropanol, acetone or methyl ethyl ketone, and successively precipitating and dissolving the solvate.

For example, the crystalline solvate, type (I-a)-4 crystal, consisting of the fluoran compound of the above formula (I-a) and toluene, can be prepared by dissolving the crystal or the amorphous state of the fluoran compound having the formula (I-a) in toluene and successively precipitating and isolating the solvate.

The aromatic hydrocarbon-based solvent, alcohol-based solvent and ketone-based solvent which are used for the preparation of the above solvates may contain other solvents.

Examples of other solvents which may be contained include ester-based solvents such as ethyl acetate, ether-bases solvents such as dioxane and tetrahydrofuran, and acetonitrile. However, solvent mixture precipitates the desired crystalline solvate and at the same time precipitates other forms of crystal such as unsolvated crystal. Hence, single use of the aromatic hydrocarbon-bases solvent, alcohol-based solvent or the ketone-based solvent is particularly preferred.

An exemplary process for precipitating and isolating the crystalline solvate of the fluoran compound represented by the formula (I) is to dissolve the crystal or amorphous state of the fluoran compound of the formula (I) in the aromatic hydrocarbon-based solvent, alcohol-based solvent or ketone-based solvent and to successively precipitate the solvate under condition of stirring or allowing to stand the solution in a temperature range of from the room temperature to the boiling point of the solvent.

The precipitated crystalline solvate is treated with a known method, for example, filtration and dried at temperature lower than the melting point of the solvate to obtain the desired crystalline solvate.

The amount of the aromatic hydrocarbon-based solvent, alcohol-based solvent or ketone-based solvent which is used in the preparation of the crystalline solvate is generally 0.4 weight or more per weight of the crystal or the amorphous state of the fluoran compound represented by the formula (I). No particular problem occurs by use of a large amount of the solvent. However, the large amount of the solvent sometimes requires concentration in order top precipitate the crystalline solvate. Consequently, the amount of the solvent is preferably from 0.4 to 100 weight, more preferably from 0.5 to 50 weight per weight of the crystal or the amorphous state of the fluoran compound of the formula (I).

In the preparation of the fluoran compound represented by the formula (I), the crystalline solvate containing the aromatic hydrocarbon-based solvent can also be directly prepared by carrying out the dehydrating condensation reaction in the presence of the aromatic hydrocarbon-based solvent, conducting alkali treatment, and thereafter precipitating the fluoran compound of the formula (I) which is dissolved in the solvent.

Table 1 illustrates examples and melting points of the crystal and the crystalline solvate of the fluoran compound represented by the formula (I).

TABLE 1

| Fluoran compound | Solvent | Melting point (°C.) | X-ray diffraction diagram (Figure) | Crystal type |
|---|---|---|---|---|
| I-a | — | 127–132 | 1 | (I-a)-1 |
|  | — | 158–161 | 2 | (I-a)-2 |
|  | benzene | 118–122 | 3 | (I-a)-3 |
|  | toluene | 118–120 | 4 | (I-a)-4 |
|  | o-xylene | 113–116 | 5 | (I-a)-5 |
|  | anisole | 109–113 | 6 | (I-a)-6 |
| I-b | — | 143–146 | 7 | (I-b)-1 |
|  | benzene | 122–126 | 8 | (I-b)-2 |
|  | toluene | 112–114 | 9 | (I-b)-3 |
|  | o-xylene | 107–123 | 10 | (I-b)-4 |
|  | m-xylene | 108–125 | 11 | (I-b)-5 |

TABLE 1-continued

| Fluoran compound | Solvent | Melting point (°C.) | X-ray diffraction diagram (Figure) | Crystal type |
|---|---|---|---|---|
| | p-xylene | 127–131 | 12 | (I-b)-6 |
| | ethylbenzene | 115–120 | 13 | (I-b)-7 |
| | anisole | 113–115 | 14 | (I-b)-8 |
| | chlorobenzene | 120–131 | 15 | (I-b)-9 |
| I-c | — | 167–169 | 16 | (I-c)-1 |
| | benzene | 134–136 | 17 | (I-c)-2 |
| | toluene | 124–126 | 18 | (I-c)-3 |
| | anisole | 123–126 | 19 | (I-c)-4 |
| I-d | — | 172–173 | 20 | (I-d)-1 |
| | benzene | 148–151 | 21 | (I-d)-2 |
| | toluene | 128–130 | 22 | (I-d)-3 |
| | isopropanol | 136–138 | 23 | (I-d)-4 |
| | acetone | 140–143 | 24 | (I-d)-5 |
| | methyl ethyl ketone | 118–120 | 25 | (I-d)-6 |

The crystalline solvate of the fluoran compound represented by the formula (I) in the invention is thought to be formed by incorporating the solvent molecule into the crystal lattice through a very specific intermolecular mutual action between the fluoran compound of the formula (I) and the aromatic hydrocarbon-based, alcohol-based or ketone-based solvent, for example, benzene, toluene, xylene, ethylbenzene, anisole, chlorobenzene, isopropanol, acetone or methyl ethyl ketone.

For example, the fluoran compound of the formula (I):

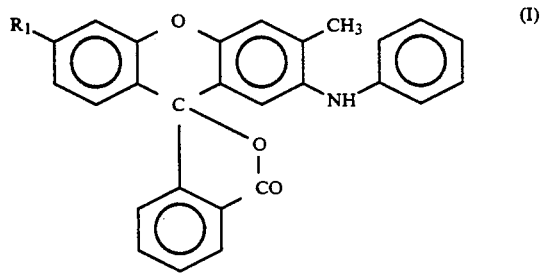

wherein $R_1$ is

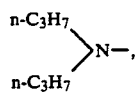

does not form toluene solvate, even though crystallinized from a toluene solution.

The fluoran compound of the formula (I) wherein $R_1$ is

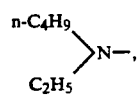

does not form toluene or isopropanol solvate, even though crystallized from a toluene solution.

The fluoran compound of the formula (I) wherein $R_1$ is

does not form toluene solvate, even though crystallized from a toluene solution.

As mentioned above, it is a very surprising and novel discovery that the fluoran compound having a specific structure characteristically forms a crystalline solvate with a specific solvent alone.

The crystal and crystalline solvate of the fluoran compound in the invention can be used for chromogenic compound of various recording materials, and can be used singly or as a mixture of tow or more fluoran compounds. Further, they can be used, if desired, as a mixture with other chromogenic compounds such as triphenylmethane lactones, fluorans and spiropyrans in order to adjust hue.

The recording material of the present invention is a pressure-sensitive or heat-sensitive recording material comprising the crystal or crystalline solvate of the fluoran compound of the present invention.

When preparing pressure-sensitive recording material, the crystal or the crystalline solvate of the fluoran compound of the invention is dissolved in a solvent which is commonly used in the field. The solvent includes a single solvent or mixture of the same selected from, for example, alkylbenzenes such as n-dodecylbenzene, alkylbiphenyls such as triethylbiphenyl and diisopropylbiphenyl, hydrogenated terphenyls, alkylnaphthalenes such as diisopropylnaphthalene, diarylethanes such as phenyl-xylylethane and styrenated ethylbenzene, and chlorinated paraffins. The resulting solution is sealed by a coacervation method or an interfacial polymerization method into microcapsules having an external wall comprised of gelatin, melamine-aldehyde resin, urea-aldehyde resin, polyurethane, polyurea, polyamide or the like. Aqueous dispersion of the microcapsules is mixed with a suitable binder, such as starch paste and latex, and applied to a suitable substrate such as paper, plastic sheet or resin coated paper. The coated back sheet for pressure-sensitive recording is thus obtained.

The microcapsule dispersion thus obtained can, of course, be used to produce a so-called middle-sheets wherein the microcapsule dispersion is applied to one side of a substrate and a coating liquid primarily comprising a developer is applied to the other side of the substrate, and to produce a so-called self contained sheets wherein both the microcapsules and the developer are present on the same side of a substrate.

The single copying sheet is prepared by applying a coating liquid comprising the microcapsules and the developer to one side of the substrate on by applying a microcapsule dispersion to one side of the substrate and then applying a coating liquid of the developer on the coated layer of microcapsules.

Exemplary developer suitable for use in the pressure-sensitive recording material includes copolymers of salicyclic acid, phenols and aldehydes such as formaldehyde; alkyl, aryl or aralkyl substituted salicyclic acid such as 3,5-di-α-methylbenzylsalicyclic acid; polycondensate of substituted salicyclic acid and styrene; alkylphenols such as octylphenyl; phenol aldehyde resin such as p-phenylphenol novolak resin; metal salts of these compounds such as zinc, magnesium, aluminium, calcium tin and nickel salts; and activated clays.

When preparing a heat-sensitive recording material of the invention, the crystal or the crystalline solvate of the fluoran compound of the present invention is pulverized in water to form an aqueous dispersion. The dispersion is mixed with an aqueous dispersion of pulverized developer, and binder is added to the thus obtained mixture.

Representative examples of the developer which are suitable for use in the heat-sensitive recording material include bisphenol A, halogenated bisphenol A, alkylated bisphenol A, dihydroxydiphenyl sulfone, halogenated dihydroxydiphenyl sulfone, alkylated dihydroxydiphenyl sulfone, hydroxybenzoic acid esters, hydroquinone monoethers and other phenol derivatives; organic developers such as salicyclic acid derivatives, salicylamide derivatives, urea derivatives, and thiourea derivatives; and inorganic developers such as acid clay, attapulgite, activated clay, aluminum chloride and zinc bromide.

Exemplary binder used for the heat-sensitive recording material includes polyvinyl alcohol, modified polyvinyl alcohol, methylcellulose, hydroxyethylcellulose, carboxymethylcellulose, gum arabic, salt of styrene-maleic anhydride copolymer, and isobutyleneacrylic acid-maleic anhydride copolymer.

Other additives can also be added to the thus obtained mixture. Exemplary additives include fillers such as talc, kaolin and calcium carbonate, and if necessary, may also include sensitizers such as higher fatty acid amides, aromatic carboxylic acid esters, aromatic sulfonic acid esters, aromatic ethers, aromatic substituted aliphatic ethers, aromatic hydrocarbons, aromatic substituted aliphatic hydrocarbons and other generally known sensitizers for the heat-sensitive recording material; UV-absorbers; and antifoaming agents.

The coating liquid obtained by the addition of the above additives can be applied to an suitable substrate such as paper, plastic sheet and resin coated paper and used as the heat-sensitive recording material. The heat-sensitive recording system of the invention can be used in a solvent system without any problem in addition to the above aqueous dispersion system. The system of the invention can also be employed for other applications using chromogenic materials, for example, temperature-indicating material.

The pressure-sensitive recording material prepared by using the crystal and the crystalline solvate of the fluoran compound represented by the formula (I) in the invention has high solubility in capsule oils and excellent weatherability of developed color image which are important characteristics strongly desired for the chromogenic compound of the pressure-sensitive recording material.

The solubility of from the type (I-a)-1 crystal to the type (I-a)-6 crystal, from the type (I-b)-1 crystal to the type (I-b)-9 crystal, from the type (I-c)-1 crystal to the type (I-b)-4 crystal, and from the type (I-d)-1 crystal to the type (I-b)-6 crystal in marketed capsule oils is compared with conventionally known fluoran compounds of the formulas (A), (B), (C) and (D), respectively. Results are illustrated in Table 2.

TABLE 2

| Crystal type | SAS-296 | | KMC-113 | |
|---|---|---|---|---|
| | 5 wt. % | 10 wt. % | 5 wt. % | 10 wt. % |
| (I-a)-1 | ◯ | ◯ | ◯ | ◯ |
| (I-a)-2 | ◯ | ◯ | ◯ | ◯ |
| (I-a)-3 | ◯ | ◯ | ◯ | ◯ |

TABLE 2-continued

| Crystal type | SAS-296 | | KMC-113 | |
|---|---|---|---|---|
| | 5 wt. % | 10 wt. % | 5 wt. % | 10 wt. % |
| (I-a)-4 | ◯ | ◯ | ◯ | ◯ |
| (I-a)-5 | ◯ | ◯ | ◯ | ◯ |
| (I-a)-6 | ◯ | ◯ | ◯ | ◯ |
| (I-b)-1 | ◯ | ◯ | ◯ | ◯ |
| (I-b)-2 | ◯ | ◯ | ◯ | ◯ |
| (I-b)-3 | ◯ | ◯ | ◯ | ◯ |
| (I-b)-4 | ◯ | ◯ | ◯ | ◯ |
| (I-b)-5 | ◯ | ◯ | ◯ | ◯ |
| (I-b)-6 | ◯ | ◯ | ◯ | ◯ |
| (I-b)-7 | ◯ | ◯ | ◯ | ◯ |
| (I-b)-8 | ◯ | ◯ | ◯ | ◯ |
| (I-b)-9 | ◯ | ◯ | ◯ | ◯ |
| (I-c)-1 | ◯ | ◯ | ◯ | ◯ |
| (I-c)-2 | ◯ | ◯ | ◯ | ◯ |
| (I-c)-3 | ◯ | ◯ | ◯ | ◯ |
| (I-c)-4 | ◯ | ◯ | ◯ | ◯ |
| (I-d)-1 | ◯ | ◯ | ◯ | ◯ |
| (I-d)-2 | ◯ | ◯ | ◯ | ◯ |
| (I-d)-3 | ◯ | ◯ | ◯ | ◯ |
| (I-d)-4 | ◯ | ◯ | ◯ | ◯ |
| (I-d)-5 | ◯ | ◯ | ◯ | ◯ |
| (I-d)-6 | ◯ | ◯ | ◯ | ◯ |
| Formula (A) | X | X | X | X |
| Formula (B) | X | X | X | X |
| Formula (C) | X | X | X | X |
| Formula (D) | X | X | X | X |

Solubility was measured by the following method.

Each sample was heat dissolved in two kinds of capsule oils, respectively, in a concentration of 5% and 10% by weight. After standing at 5° C. for a week, precipitation of crystal was examined.

In the table, ◯ indicates that no crystal was precipitated and X indicates that precipitation of crystal was observed.

SAS-296 is a capsule oil manufactured by Nippon Petrochemical Co. and KMC-113 is a capsule oil manufactured, by Kureha Chemical Industry Co.

The compound of the formula (A) did not completely dissolve even in hot KMC-113.

As clearly illustrated in table 2, the crystal and crystalline solvate of the fluoran compound represented by the formula (I) of the invention have high solubility in each capsule oil as compared with the fluoran compounds of the formulas (A), (B), (C) and (D).

The results mean that precipitation of crystal does not occur during storage in the capsule oils in preparing the heat-sensitive recording material, and that crystal precipitation in microcapsules is not liable to occur after preparation of the microcapsules. The crystalline solvate of the fluoran compound represented by the formula (I) of the invention has a very quick rate of dissolving into the capsule oils and hence has excellent property as a chromogenic compound of the heat-sensitive recording materials.

The crystal and the crystalline solvate of the fluoran compound represented by the formula (I) of the invention has higher bulk density than conventionally known amorphous fluoran compounds of the formula (I). consequently, in the preparation of the crystal and crystalline solvate of the invention and also in the preparation of the recording materials by using the crystal and crystalline solvate as chromogenic compounds, handling can be carried out under good workability.

Table 3 illustrates bulk density of the type (I-a)-2 crystal and type (I-b)-1 crystal of the invention, and that of the amorphous fluoran compounds which is prepared by the process disclosed in Japanese Laid-Open Patent SHO 60-47068(1985), has a melting point of 114°-117° C., and has the formula (I-b), respectively.

TABLE 3

|  | Bulk density (g/ml) |
|---|---|
| Type (I-a)-2 crystal | 0.58 |
| Type (I-b)-1 crystal | 0.60 |
| Formula (I-b) in Japanese Laid-Open Patent 60-47068 | 0.31 |

As illustrated in Table 3, the type (I-a)-2 crystal and the type (I-b)-1 crystal of the invention have a very high bulk density as compared with the amorphous fluoran compound of the formula (I-b) prepared according to Japanese Laid-Open Patent SHO 60-47068(1985).

When preparing the heat-sensitive recording material by using the crystal of the fluoran compound represented by the formula (I) of the invention, a heat-sensitive recording paper obtained has a high whiteness without soil as compared with the amorphous fluoran compound of the formula (I).

For example, heat-sensitive recording papers were prepared by using, as chromogenic compound, the type (I-a)-2 crystal, type (I-b)-1 crystal, type (I-c)-1 crystal and type (I-d)-1 crystal of the fluoran compound having the formula (I) in the invention and by using bisphenol A as a developer for each chromogenic compound.

On the other hand, heat-sensitive recording papers were prepared for comparison by using, as chromogenic compounds, the amorphous fluoran compounds having the formulas (I-a), (I-b), (I-c) and (I-d) which were prepared according to Japanese Laid-Open Patent SHO 60-47068(1985) and by using bisphenol A for each chromogenic compound.

The whiteness of uncolored portion on these heat-sensitive recording papers were compared, and results are illustrated in Table 4.

TABLE 4

| Fluoran compound | Whiteness of paper |
|---|---|
| Type (I-a)-2 crystal | ○ |
| Type (I-b)-1 crystal | ○ |
| Type (I-c)-1 crystal | ○ |
| Type (I-d)-1 crystal | ○ |
| Amorphous compound of formula (I-a) | X |
| Amorphous compound of formula (I-b) | X |
| Amorphous compound of formula (I-c) | X |
| Amorphous compound of formula (I-d) | X |

The whiteness of the uncolored portion on the heat-sensitive recording papers was evaluated by visual observation.

○ indicates a heat-sensitive recording paper which has high whiteness without soil and no problem in practical use.

X indicates a heat-sensitive recording paper which is soiled to dark gray, has loss whiteness and is unsuitable for practical use.

As clearly illustrated in Table 4, the heat-sensitive recording papers obtained by using the fluoran compound represented by the formula (I) of the invention has high whiteness without soil as compared with amorphous fluoran compounds represented by the formula (I).

Further, the heat-sensitive recording material prepared from the crystal and crystalline solvate of the fluoran compound represented by the formula (I) of this invention can quickly developed color at lower temperatures as compared with conventionally known compounds of the formulas (A), (B), (C) and (D). Hence, the compounds of the present invention have very excellent performance as chromogenic compounds in view of high speed and high density recording desired today.

For example, heat-sensitive recording papers were prepared by using, as chromogenic compound, the type (I-a)-1 crystal, type (I-a)-4 crystal, type (I-b)-1 crystal, type (I-b)-3 crystal, type (I-c)-1 crystal, type (I-c)-3 crystal, type (I-d)-1 crystal and type (I-d)-4 crystal, and by using bisphenol A as a developer. The color density characteristics depending upon the temperature change were measured on each heat-sensitive recording paper thus obtained. Results are illustrated in Table 5.

TABLE 5

| Chromogenic compound | Color developing temperature (°C.) | | | | | | |
|---|---|---|---|---|---|---|---|
|  | 85 | 90 | 95 | 100 | 110 | 120 | 150 |
| Type (I-a)-1 crystal | 0.17 | 0.20 | 0.22 | 0.40 | 0.80 | 1.20 | 1.36 |
| Type (I-a)-4 crystal | 0.20 | 0.20 | 0.28 | 0.70 | 1.04 | 1.28 | 1.36 |
| Type (I-b)-1 crystal | 0.15 | 0.15 | 0.15 | 0.20 | 0.68 | 1.15 | 1.35 |
| Type (I-b)-3 crystal | 0.17 | 0.17 | 0.25 | 0.47 | 0.99 | 1.29 | 1.35 |
| Type (I-c)-1 crystal | 0.13 | 0.13 | 0.15 | 0.20 | 0.65 | 1.15 | 1.35 |
| Type (I-c)-3 crystal | 0.15 | 0.15 | 0.25 | 0.51 | 1.04 | 1.29 | 1.35 |
| Type (I-d)-1 crystal | 0.11 | 0.11 | 0.12 | 0.20 | 0.67 | 1.12 | 1.35 |
| Type (I-d)-4 crystal | 0.15 | 0.15 | 0.22 | 0.43 | 1.01 | 1.25 | 1.35 |
| Formula (A) | 0.15 | 0.18 | 0.20 | 0.20 | 0.31 | 0.98 | 1.35 |
| Formula (B) | 0.11 | 0.11 | 0.11 | 0.12 | 0.22 | 0.62 | 1.35 |
| Formula (C) | 0.15 | 0.17 | 0.17 | 0.18 | 0.18 | 0.42 | 1.35 |
| Formula (D) | 0.15 | 0.15 | 0.16 | 0.16 | 0.20 | 0.45 | 1.35 |

Color development of the heat-sensitive recording papers obtained was carried out with a temperature gradient taster (RODIACETA) by heating for 5 seconds at each temperature of 85° C., 90° C., 100° C., 110° C., 120° C. or 150° C. Color density was measured with a Macbeth reflection densitometer (Trademark; TR-524). Larger values indicate higher density of developed color.

Table 5 illustrates color density characteristics depending upon temperature change on the crystal of the fluoran compound represented by the formula (I) in the invention and reference compounds of the formulas (A), (B), (C) and (D).

As clearly illustrated in Table 5, the crystal and the crystalline solvate of the fluoran compound represented the formula (I) in the invention have a quite excellent characteristic of developing color more quickly at lower temperatures as compared with the compounds of the formulas (A), (B), (C) and (D).

The fluoran compound represented the formula (I) in the invention differs from the compounds of the formulas (A), (B), (C) and (D) only in the substituent attached to the amino group at the position 3 of the fluoran structure. However, as mentioned above, the crystal and the crystalline solvate of the present invention have extremely outstanding characteristic as the chromogenic compound such as solubility in capsule oils and heat-sensitive color developing characteristics, as compared with the above conventionally known compounds.

The crystal and the crystalline solvate of the fluoran compound represented by the formula (I) in the invention have very excellent properties as the color forming compound of recording materials as compared with amorphous fluoran compounds represented by the formula (I)

The present invention will hereinafter be illustrated further in detail by way of examples. However, it is to be understood that the invention is not intended to be limited to the specific embodiments.

EXAMPLE 1

Preparation of Type (I-a)-1 Crystals

After dissolving 200 of 2-(4'-isopropyl-N-methylamino-2'-hydroxybenzoyl)benzoic acid, the compound of the formula (II-a) having a melting point of 178°~180° C., in 800 ml of concentrated sulfuric acid at 10° C., 130 g of 4-methoxy-2-methyldiphenylamine, the compound of the formula (III) wherein $R_2$ is methyl, was added at the same temperature and stirred at 10°~25° C. for 48 hours. The reaction mixture was poured into 8000 ml of ice water. The separated solid was collected, washed with water and added to 1000 ml of a 20% aqueous sodium hydroxide solution. To the mixture, 1000 ml of toluene was further added and stirred at 60°~70° C. for 2 hours. The toluene layer was separated and washed with warm water until water becomes neutral after washing. The toluene layer was separated and concentrated at 40° C. under reduced pressure. The separated crystals were filtered, washed with a small amount of toluene. The crystals were the crystalline solvate of type (I-a)-4 consisting of the fluoran compound of formula (I-a) and toluene.

The crystals thus obtained were sludged for an hour in 1500 ml of methanol at the room temperature and filtered. The procedures were carried out twice and the crystals were dried at 40° C. for 18 hours to obtain 212 g of type (I-a)-1 crystals of 3-N-isopropyl-N-methylamino-6-methyl-7-anilinofluoran as almost colorless crystal. Melting point was 127°~132° C.

A toluene solution of the crystal was colorless and transparent. Black color was quickly developed on silica gel. A powder X-ray diffraction diagram by Cu-K$\alpha$ beam is illustrated in FIG. 1.

EXAMPLE 2

Preparation of Type (I-a)-2 Crystals

After dissolving 100 g of 2-(4'-N-isopropyl-N-methylamine-2'-hydroxybenzoyl)benzoic acid, the compound of the formula (II-a), in 400 ml of concentrated sulfuric acid at 10° C., 65 g of 4-methoxy-2-methyldiphenylamino was added at the same temperature and stirred at 10°~25° C. for 36 hours. The reaction mixture was poured into 4000 ml of ice water. The separated solid was collected, washed with water and added to 1000 ml of a 10% aqueous sodium hydroxide solution. To the mixture, 450 ml of toluene was added and stirred at 60°~70° C. for 2 hours. The toluene layer was separated and washed with warm water until the water becomes neutral after washing. The toluene layer was separated and concentrated at 40° C. under reduced pressure. The precipitated crystals were filtered and washed with a small amount of toluene. The crystals were the crystalline solvate of type (I-a)-4 consisting of the fluoran compound of formula (I-a) and toluene.

The crystal thus obtained were recrystallized from 700 ml of isopropanol and dried at 40° C. for 24 hours to obtain 110 g of type (I-a)-2 crystal of 3-N-isopropyl-N-methylamino-6-methyl-7-anilinofluoran as almost colorless crystal. Melting point was 158°~161° C.

Figure 2:
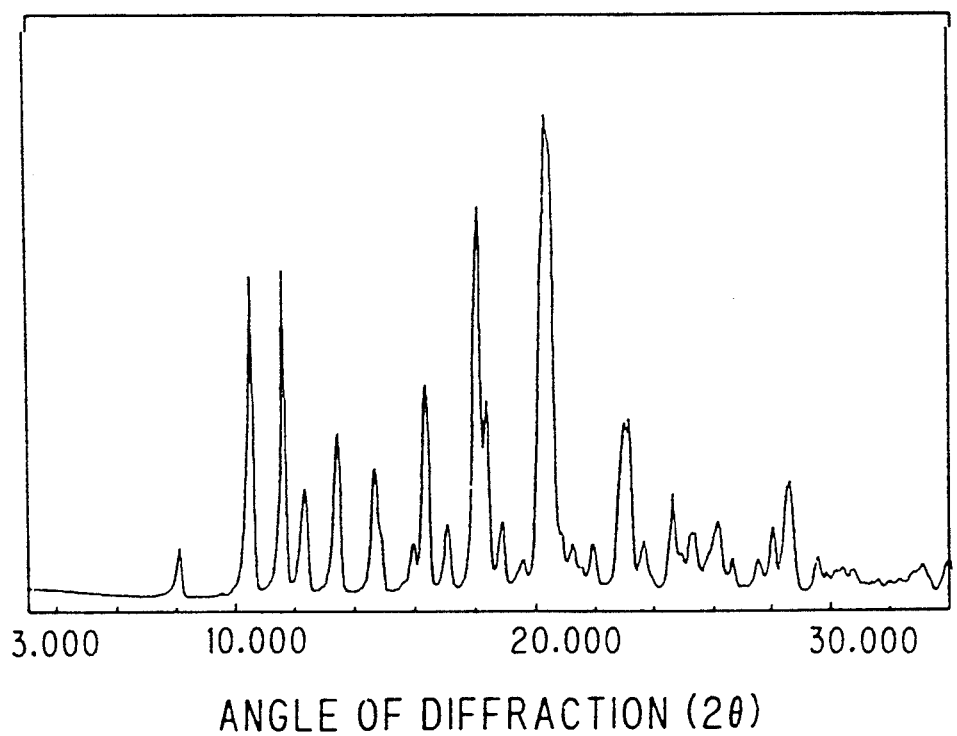
FIG. 2: Type (I-a)-2 Crystal.

A toluene solution of the crystal was colorless and transparent. Black color was quickly developed on silica gel. A powder X-ray diffraction diagram by Cu-K$\alpha$ beam is illustrated in FIG. 2.

EXAMPLE 3

Preparation of Type (I-a)-3 Crystal

EXAMPLE 4

After heat-dissolving 10.0 g of type (I-a)-2 crystals of 3-N-isopropyl-N-methylamino-6-methyl-7-anilinofluoran which was prepared in Example 2 at 100° C. in 20 ml of benzene, the solution was allowed to stand for 24 hours at the room temperature. The precipitated crystal were collected and dried for 24 hours at 40° C. to obtain 9.4 g of type (I-a)-3 crystal as almost colorless crystal.

Melting point was 188°~122° C. The toluene solution of the crystalline solvate was colorless and transparent, and quickly developed black color on silica gel. A powder X-ray diffraction diagram by Cu-K$\alpha$ beam is illustrated in FIG. 3.

EXAMPLE 4

Preparation of Type (I-a)-4 Crystals

The same procedures as described in Example 3 were carried out except benzene was replaced by toluene to obtain type (I-a)-4 crystals as almost colorless crystal.

Melting point was 118°~120° C. The toluene solution of the crystalline solvate was colorless and transparent, and quickly developed black color on silica gel. The toluene solution of the crystalline solvate was colorless and transparent, and quickly developed black color on silica gel. A powder X-ray diffraction diagram by Cu-K$\alpha$ beam is illustrated in FIG. 4.

EXAMPLE 5

Preparation of Type (I-a)-5 Crystals

The same procedures as described in Example 3 were carried out except that o-xylene was used in place of benzene to obtain type (I-a)-5 crystal in the form of almost colorless crystal. Melting point was 113°–116° C. The toluene solution of the crystalline solvate was almost colorless and transparent, and quickly developed black color on silica gel. The powder X-ray diffraction diagram by Cu-K$\alpha$ beam is illustrated in FIG. 5.

EXAMPLE 6

Preparation of Type (I-a)-6 Crystals

The same procedures as described in Example 3 were carried out except that anisole was used in place of benzene to obtain type (I-a)-6 crystal in the form of almost colorless crystal. Melting point was 109°~113° C. The toluene solution of the crystalline solvate was colorless and transparent, and quickly developed black color on silica gel. The powder X-ray diffraction diagram by Cu-K$\alpha$ beam is illustrated in FIG. 6.

EXAMPLE 7

Preparation of Type (I-b)-1 Crystals

Figure 7:
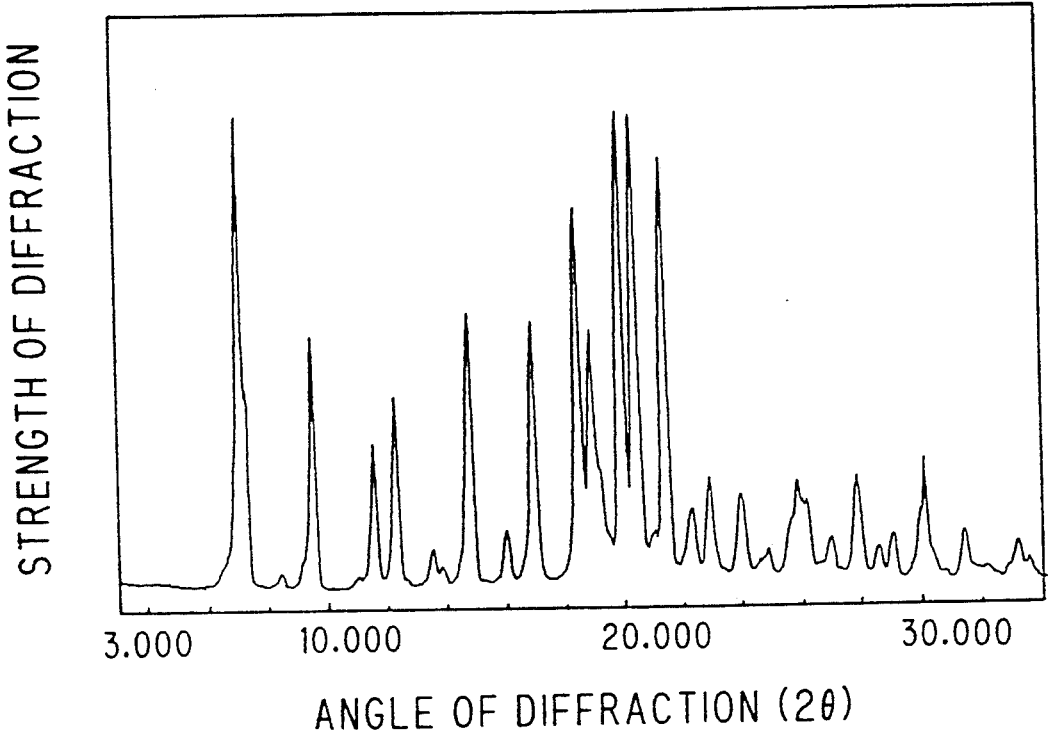
FIG. 7: Type (I-b)-1 Crystal.

The same procedures as described in Example 2 were carried out except that 2-(4'-N-isopropyl-N-methylamino-2'-hydroxybenzoyl)benzoic acid, the compound of the formula (II-a), was replaced by 2-(4'-N-sec-butyl-N-methylamino-2'-hydroxybenzoyl)benzoic acid, the compound of the formula (II-b) having a melting point of 165°~167° C., to prepare the crystalline solvate of type (I-b)-3 crystals consisting of the fluoran compound of the formula (I-b) and toluene. The crystalline solvate thus obtained were recrystallized from isopropanol to obtain type (I-b)-1 crystals of 3-N- sec-butyl-N-methylamino-6-methyl-7-anilinofluoran as almost colorless crystal. Melting point was 143°~146° C. The toluene solution of the crystal was colorless and transparent, and quickly developed black color on silica gel. The powder X-ray diffraction diagram by Cu-Kα beam is illustrated in FIG. 7.

EXAMPLE 8

Preparation of Type (I-b)-2 Crystals

After heat-dissolving 10.0 g of type (I-b)-1 crystal of 3-N-sec-butyl-N-methylamino-6-methyl-7-anilinofluoran which was prepared in Example 7, at 70° C. in 20 ml of benzene, the solution obtained was allowed to stand for 24 hours at the room temperature. The precipitated crystal were filtered and dried at 40° C. for 36 hours to obtain 9.5 g of type (I-b)-2 crystal as almost colorless crystal. Melting point was 122°~126° C. The toluene solution of the crystalline solvate was colorless and transparent, and quickly developed black color on silica gel. The powder X-ray diffraction diagram by Cu-Kα beam is illustrated in FIG. 8.

EXAMPLE 9

Preparation of Type (I-b)-3 Crystals

The same procedures as described in Example 8 were carried out except that benzene was replaced by toluene to obtain type (I-b)-3 crystal in the form of almost colorless and transparent crystal. Melting point was 112°~114° C. The toluene solution of the crystalline solvate was colorless and transparent and quickly developed black color on silica gel. The powder X-ray diffraction diagram by Cu-Kα beam is illustrated in FIG. 9.

EXAMPLE 10

Preparation of Type (I-b)-4 Crystals

The same procedures as described in Example 8 were carried out except that benzene was replaced by o-xylene to obtain type (I-b)-4 crystal as almost colorless crystal. Melting point is 107°~123° C. The toluene solution of the crystalline solvate was colorless and transparent, and quickly developed black color on silica gel. The powder X-ray diffraction diagram by Cu-Kα beam is illustrated in FIG. 10.

EXAMPLE 11

Preparation of Type (I-b)-5 Crystals

The same procedures as described in Example 8 were carried out except that benzene was replaced by m-xylene to obtain type (I-b)-5 crystals in the form of almost colorless crystal. Melting point was 108°~125° C. The toluene solution of the crystalline solvate was colorless the transparent and quickly developed black color on silica gel. The powder X-ray diffraction diagram by Cu-Kα beam is illustrated in FIG. 11.

EXAMPLE 12

Preparation of Type (I-b)-6 Crystals

The same procedures as described in Example 8 were carried out except that benzene was replaced by p-xylene to obtain type (I-b)-6 crystals as almost colorless crystal. Melting point was 127°~131° C. The toluene solution of the crystalline solvate was colorless and transparent and quickly developed black color on silica gel. The powder X-ray diffraction diagram by Cu-Kα beam is illustrated in FIG. 12.

EXAMPLE 13

Preparation of Type (I-b)-7 Crystals

The same procedures as described in Example 8 were carried out except that benzene was replaced by ethylbenzene to obtain type (I-b)-7 crystals in the form of almost colorless crystal. Melting point was 115°~120° C. The toluene solution of the crystalline solvate was colorless and transparent, and quickly developed black color on silica gel. The powder X-ray diffraction diagram by Cu-Kα beam is illustrated in FIG. 13.

EXAMPLE 14

Preparation of Type (I-b)-8 Crystals

The same procedures as described in Example 8 were carried out except that benzene was replaced by anisole to obtain type (I-b)-8 crystals in the form of almost colorless crystal. Melting point was 113°~115° C. The toluene solution of the crystalline solvate was colorless and transparent, and quickly developed black color on silica gel. The powder X-ray diffraction diagram by Cu-Kα beam is shown in FIG. 14.

EXAMPLE 15

Preparation of Type (I-b)-9 Crystals

The same procedures as described in Example 8 were carried out except that benzene was replaced by chlorobenzene to obtain type (I-b)-9 crystals in the form of almost colorless crystal. Melting point was 120°~131° C. The toluene solution of the crystalline solvate was colorless and transparent, and quickly developed black color on silica gel. The powder X-ray diffraction diagram by Cu-Kα beam is shown in FIG. 15.

EXAMPLE 16

Preparation of Type (I-c)-1 Crystals

The same procedures as described in Example 2 were carried out except that 2-(4'-N-isopropyl-N-methylamino-2'-hydroxybenzoyl)benzoic acid, the compound of the formula (II-a), was replaced by 2-(4'-N-ethyl-N-methylamino-2'-hydroxybenzoyl)benzoic acid, the compound of the formula (II-c) having a melting point of 172°~175° C., to prepare the crystalline solvate of type (I-c)-3 crystals consisting of the fluoran compound of the formula (I-c) and toluene. The crystalline solvate thus obtained were recrystallized from isopropanol to obtain type (I-c)-1 crystals of 3-N-ethyl-N-methylamino-6-methyl-7-anilinofluoran as almost colorless crystal.

Figure 16:
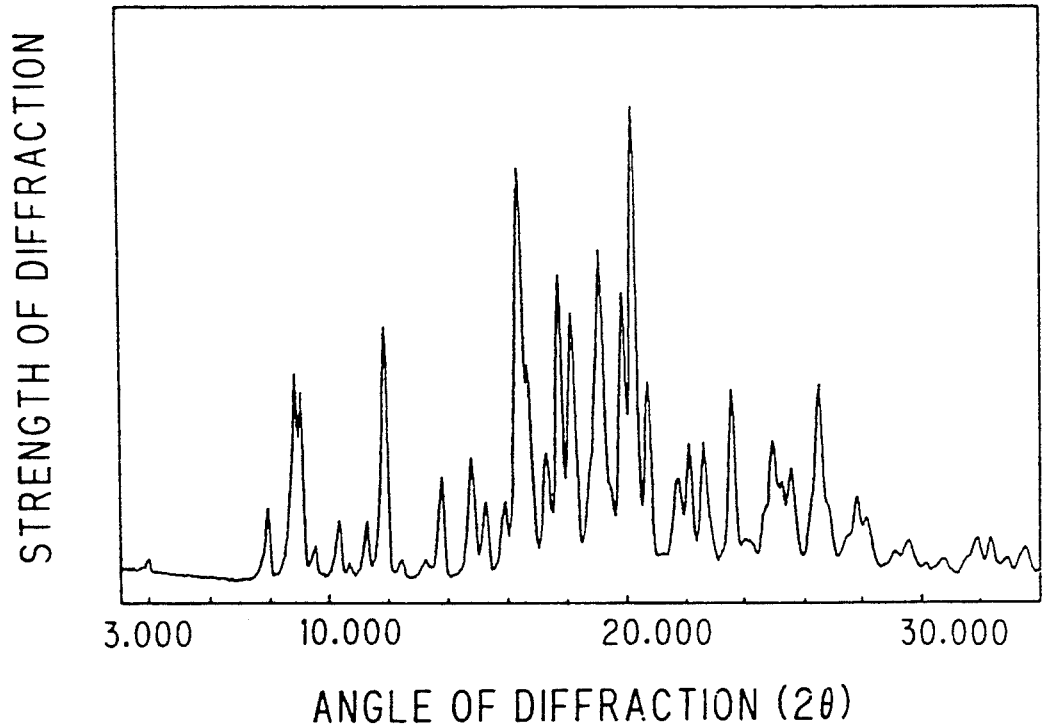
FIG. 16: Type (I-c)-1 Crystal.

Melting point was 167°~169° C. The toluene solution of the crystals was colorless and transparent, and quickly developed black color on silica gel. The powder X-ray diffraction diagram by Cu-Kα beam is illustrated in FIG. 16.

EXAMPLE 17

Preparation of Type (I-c)-2 Crystals

After heat-dissolving 10.0 g of type (I-c)-1 crystals of 3-N-ethyl-N-methylamino-6-methyl-7-anilinofluoran which was prepared in Example 16, at 70° C. in 20 ml of benzene, the solution obtained was allowed to stand for 24 hours at the room temperature. The precipitated crystals were filtered and dried at 40° C. for 36 hours to obtain 9.5 g of type (I-c)-2 crystals as almost colorless crystals. Melting point was 134°~136° C. The toluene solution of the crystals was colorless and transparent, and quickly developed black color on silica gel. The powder X-ray diffraction diagram by Cu-Kα beam is illustrated in FIG. 17.

EXAMPLE 18

Preparation of Type (I-c)-3 Crystals

The same procedures as described in Example 17 were carried out except that benzene was replaced by toluene to obtain type (I-c)-3 crystals in the form of almost colorless and transparent crystals. Melting point was 124°~126° C. The toluene solution of the crystalline solvate was colorless and transparent, and quickly developed black color on silica gel. The powder X-ray diffraction diagram by Cu-Kα beam is illustrated in FIG. 18.

EXAMPLE 19

Preparation of Type (I-c)-4 Crystals

The same procedures as described in Example 17 were carried out except that benzene was replaced by anisole to obtain type (I-c)-4 crystals as almost colorless crystal. Melting point is 123°~126° C. The toluene solution of the crystalline solvate was colorless and transparent, and quickly developed black color on silica gel. The powder X-ray diffraction diagram by Cu-Kα beam is illustrated in FIG. 19.

EXAMPLE 20

Preparation of Type (I-d)-1 Crystals

Figure 20:
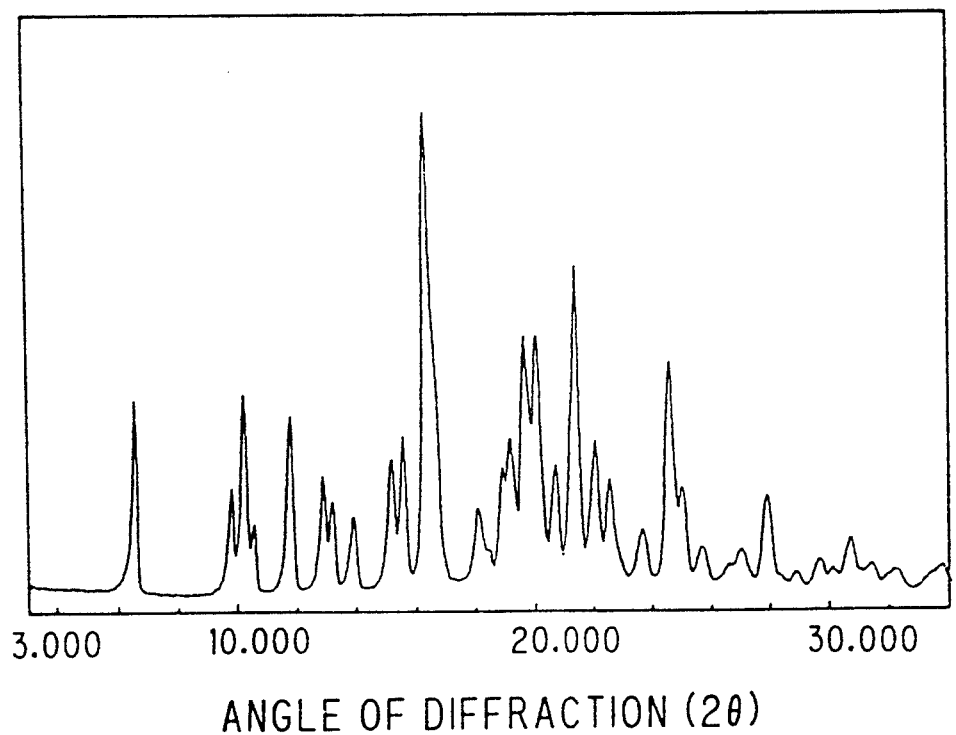
FIG. 20: Type (I-d)-1 Crystal.

The same procedures as described in Example 2 were carried out except that 2-(4'-N-isopropyl-N-methylamino-2'-hydroxybenzoyl)benzoic acid, the compound of the formula (II-a), was replaced by 2-(4'-N-isobutyl-N-isopropylamino-2'-hydroxybenzoyl)benzoic acid, the compound of the formula (II-d) having a melting point of 182°~185° C., to prepare the crystalline solvate of type (I-d)-3 crystals consisting of the fluoran compound of the formula (I-d) and toluene. The crystalline solvate thus obtained were recrystallized from n-butanol to obtain type (I-d)-1 crystals of 3-N-isobutyl-N-isopropylamine-6-methyl-7-anilinofluoran as almost colorless crystal. Melting point was 172°~173° C. The toluene solution of the crystals was colorless and transparent, and quickly developed black color on silica gel. The powder X-ray diffraction diagram by Cu-Kα beam is illustrated in FIG. 20.

EXAMPLE 21

Preparation of Type (I-d)-2 Crystals

After heat-dissolving 10.0 g of type (I-d)-1 crystals of 3-N-isobutyl-N-isopropylamino-6-methyl-7-anilinofluoran which was prepared in Example 20, at 70° C. in 20 ml of benzene, the solution obtained was allowed to stand for 24 hours at the room temperature. The precipitated crystals were filtered and dried at 40° C. for 24 hours to obtain 9.5 g of type (I-d)-2 crystals as almost colorless crystals. Melting point was 148°~151° C. The toluene solution of the crystalline solvate was colorless and transparent, and quickly developed black color on silica gel. The powder X-ray diffraction diagram by Cu-Kα beam is illustrated in FIG. 21.

EXAMPLE 22

Preparation of Type (I-d)-3 Crystals

The same procedures as described in Example 21 were carried out except that benzene was replaced by toluene to obtain type (I-d)-3 crystals in the form of almost colorless crystal. Melting point was 128°~130° C. The toluene solution of the crystalline solvate was colorless and transparent and quickly developed black color on silica gel. The powder X-ray diffraction diagram by Cu-Kα beam is illustrated in FIG. 22.

EXAMPLE 23

Preparation of Type (I-d)-4 Crystals

The same procedures as described in Example 21 were carried out except that benzene was replaced by isopropanol to obtain type (I-d)-4 crystals as almost colorless crystals. Melting point is 136°~138° C. The toluene solution of the crystalline solvate was colorless and transparent, and quickly developed black color on silica gel. The powder X-ray diffraction diagram by Cu-Kα beam is illustrated in FIG. 23.

EXAMPLE 24

Preparation of Type (I-d)-5 Crystals

The same procedures as described in Example 21 were carried out except that benzene was replaced by acetone to obtain type (I-d)-5 crystals in the form of almost colorless crystal. Melting point was 140°-143° C. The toluene solution of the crystalline solvate was colorless and transparent and quickly developed black color on silica gel. The powder X-ray diffraction diagram by Cu-Kα beam is illustrated in FIG. 24.

EXAMPLE 25

Preparation of Type (I-d)-6 Crystals

The same procedures as described in Example 21 were carried out except that benzene was replaced by methyl ethyl ketone to obtain type (I-d)-6 crystals as almost colorless crystal. Melting point was 118°~120° C. The toluene solution of the crystalline solvate was colorless and transparent and quickly developed black color on silica gel. The powder X-ray diffraction diagram by Cu-Kα beam is illustrated in FIG. 25.

EXAMPLE 26

Preparation of Type (I-a)-1 Crystals from Type (I-a)-4 Crystals

After sludging 10.0 g of type (I-a)-4 crystals prepared in Example 4 in 100 ml of methanol at the room temperature for 2 hours, the mixture was filtered. The collected crystals were dried at 40° C. for 12 hours to obtain 8.5 g of type (I-a)-1 Crystals. Melting point was 127°~132° C.

EXAMPLE 27

Preparation of Type (I-a)-1 Crystals from Type (I-a)-5 crystals

The same procedures as described in Example 26 were carried out except that type (I-a)-4 crystals were replaced by type (I-a)-5 crystals to obtain type (I-a)-1 crystals.

Melting point 127°~132° C.

EXAMPLE 28

Preparation of Type (I-a)-3 Crystals from Type (I-a)-1 Crystals

After heat-dissolving 20.0 g of type (I-a)-1 crystals prepared in Example 1 in 100 ml of n-butanol, the resulting solution was cooled to the room temperature and precipitated crystals were filtered to obtain 18 g type (I-a)-2 crystals. Melting point was 158°~161° C.

EXAMPLE 29

Preparation of Type (I-a)-2 Crystals from Type (I-a)-5 Crystals

After heat-dissolving 10 g of type (I-a)-5 crystals prepared in Example 5 in 80 ml of acetonitrile, the resulting solution was cooled to the room temperature and precipitated crystals were filtered to obtain 8.5 g of type (I-a)-2 crystals. Melting point was 158°~161° C.

EXAMPLE 30

Preparation of Type (I-b)-1 Crystals from Type (I-b)-3 Crystals

After heat-dissolving 20 g of type (I-b)-3 crystals prepared in Example 9 in a solvent mixture of 50 ml of n-butanol and 100 ml of isopropanol, the resultant solution was cooled to the room temperature and precipitated crystals were filtered to obtain 17 g of type (I-b)-1 crystals. Melting point was 143°~146° C.

EXAMPLE 31

Preparation of Type (I-c)-1 Crystals from Type (I-c)-2 Crystals

After heat-dissolving 20 g of type (I-c)-2 crystals prepared in Example 17 in 200 ml of acetone, the resulting solution was cooled to the room temperature and precipitated crystals were filtered to obtain 16.5 g of type (I-c)-1 crystals. Melting point was 167°~169° C.

EXAMPLE 32

Preparation of Type (I-d)-3 Crystals from Type (I-d)-4 Crystals

After heat-dissolving 10 g of type (I-d)-4 crystals prepared in Example 23 in 120 ml of n-butanol, the resulting solution is cooled to the room temperature and the precipitated crystals were filtered to obtain 8.8 g of type (I-d)-1 crystals. Melting point was 172°~173° C.

COMPARATIVE EXAMPLE 1

Preparation of Fluoran Compound of Formula (I-b) by Japanese Laid-Open Patent SHO 60-47068(1985)

After dissolving 16.4 g of 2-(4'-N-sec-butyl-N-methylamino-2'-hydroxybenzoyl)benzoic acid, the compound of the formula (II-b), in 150 g of 96% concentrated sulfuric acid, 10.7 g of 4-methoxy-2-methyldiphenylamine was added at 10°~15° C., dissolved and stirred for 24 hours at the same temperature.

Figure 26:
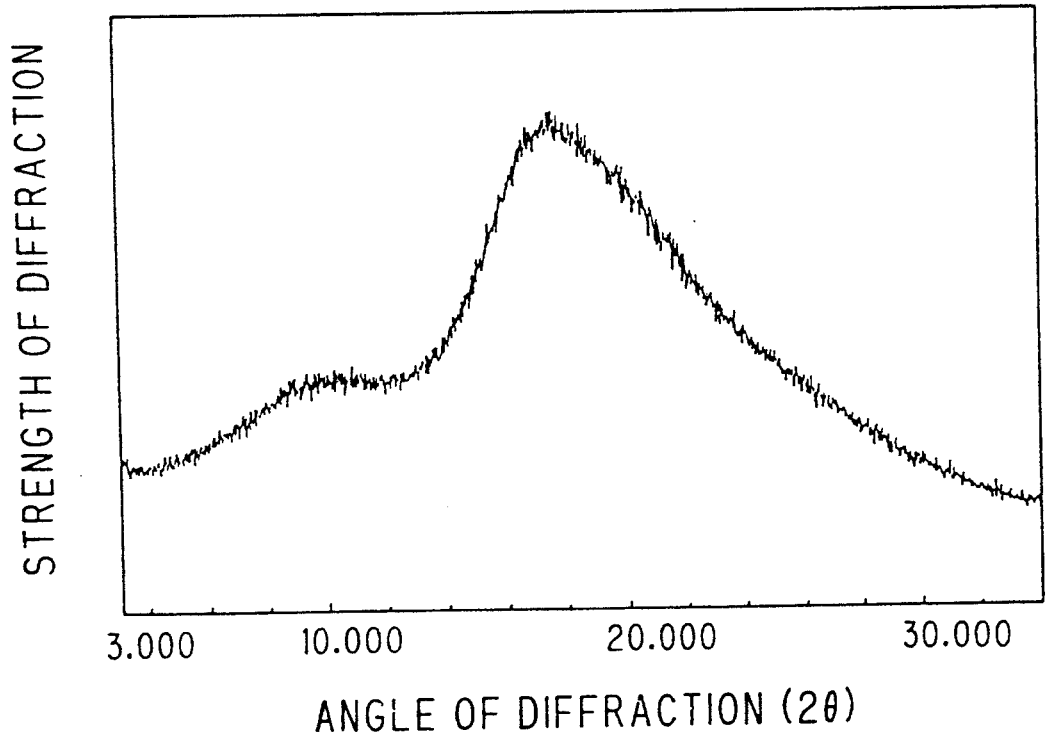
FIG. 26: Fluoran Compound of Formula (I-b) prepared in Comparative Example 1.

The resulting solution was poured into 800 g of ice water and the precipitate was filtered and washed with water. The solid obtained was added to 150 ml of a 20% aqueous sodium hydroxide solution to make the solid alkaline and stirred at 60°~70° C. for 2 hours. The solid was filtered and washed with water and dried. Thereafter the solid was recrystallized from ethylene glycol and a water-methanol mixture to obtain 12.0 g of 3-N-sec-butyl-N-methylamino-6-methyl-7-anilinofluoran in the form of almost colorless powder. Melting point was 114°~117° C. The fluoran compound of the formula (I-b) thus obtained was proved amorphous by powder X-ray diffraction analysis. The powder X-ray diffraction diagram by Cu-Kα beam is illustrated in FIG. 26.

COMPARATIVE EXAMPLE 2

Preparation of Fluoran Compound of Formula (I-a) by Japanese Laid-Open Patent SHO 60-47068(1985)

The same procedures as described in Comparative Example 1 were carried out except that 2-(4'-N-sec-butyl-N-methylamino-2'-hydroxybenzoyl benzoic acid is replaced by 2-(4'-N-isoprepyl-N-methylamino-2'-hydroxybenzoyl)benzoic acid, the compound of the formula (II-a) to obtain 3-N-isopropyl-N-methylamino-6-methyl-7-anilinofluoran, represented by the formula (I-a).

Figure 27:
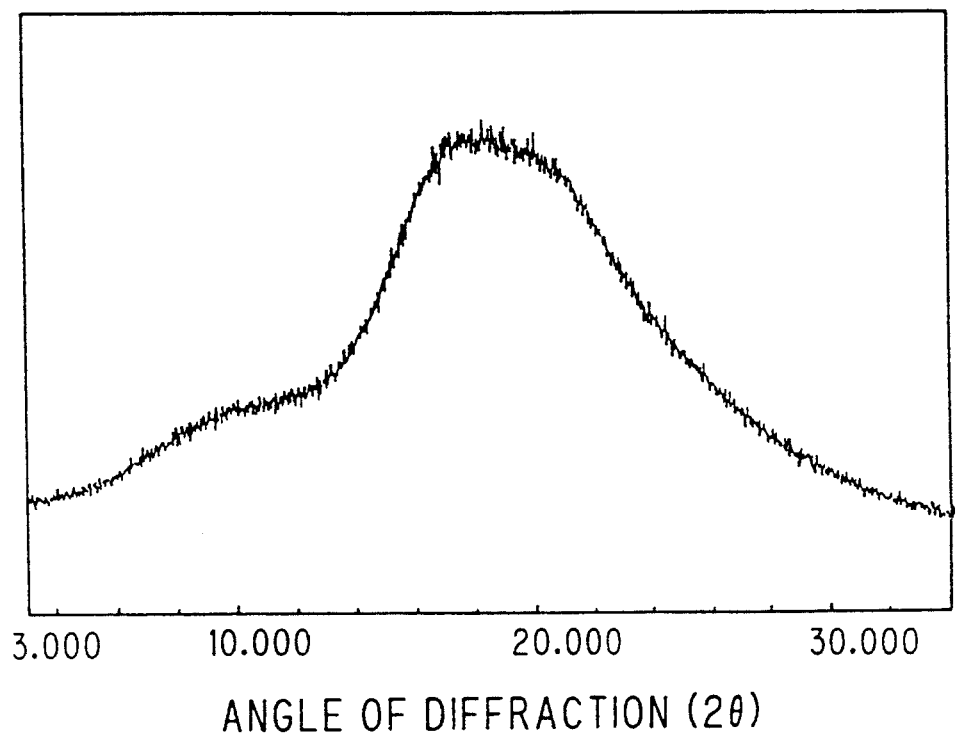
FIG. 27: Fluoran Compound of Formula (I-a) prepared in Comparative Example 2.

Melting point was 113°~116° C. The fluoran compound of the formula (I-a) thus obtained was proved amorphous by powder X-ray diffraction analysis. The powder X-ray diffraction diagram by Cu-Kα beam is illustrated in FIG. 27.

COMPARATIVE EXAMPLE 3

Preparation of Fluoran Compound of Formula (I-c) by Japanese Laid-Open Patent SHO 60-47068(1985)

Figure 28:
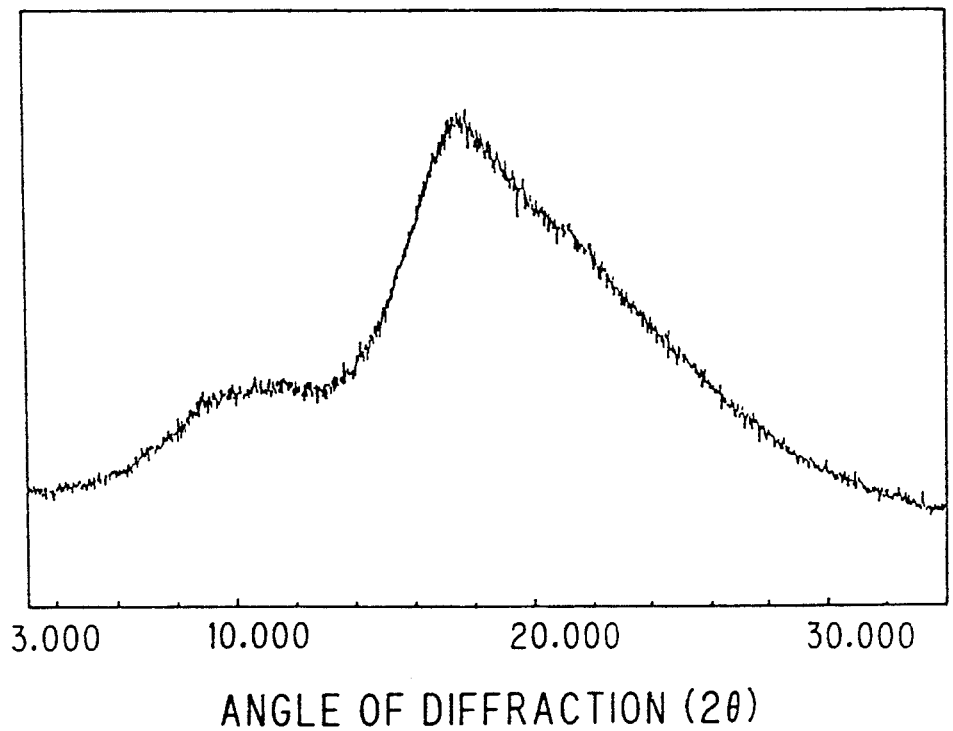
FIG. 28: Fluoran Compound of Formula (I-c) prepared in Comparative Example 3.

The same procedures as described in Comparative Example 1 were carried out except that 2-(4'-N-sec-butyl-N-methylamino-2'-hydroxybenzoyl benzoic acid is replaced by 2-(4'-N-ethyl-N-methylamino-2'-hydroxybenzoyl)benzoic acid, the compound of the formula (II-c) to obtain 3-N-ethyl-N-methylamino-6-methyl-7-anilinofluoran. Melting point was 114°~117° C. The fluoran compound of the formula (I-c) was proved amorphous by powder X-ray diffraction analysis. The powder X-ray diffraction diagram by Cu-Kα beam is illustrated in FIG. 28.

COMPARATIVE EXAMPLE 4

Preparation of Fluoran Compound of Formula (I-c) by Japanese Laid-Open Patent SHO 60-47068(1985)

The same procedures as described in Comparative Example 1 were carried out except that 2-(4'-N-sec-butyl-N-methylamino-2'-hydroxybenzoyl benzoic acid is replaced by 2-(4'-N-isobutyl-N-isopropylamino-2'-hydroxybenzoyl)benzoic acid, the compound of the formula (II-d) to obtain 3-N-isobutyl-N-isopropylamino-6-methyl-7-anilinofluoran represented by the formula (I-d). Melting point was 115°~119° C.

The fluoran compound of the formula (I-d) thus obtained was proved amorphous by powder X-ray diffraction analysis. The powder X-ray diffraction diagram by Cu-Kα beam is illustrated in FIG. 29.

EXAMPLE 33

Preparation of Type (I-b)-1 Crystals from Amorphous Fluoran Compound of formula (I-b) in Comparative Example 1

After heat-dissolving 10 g of the amorphous fluoran compound of the formula (I-b) prepared in Comparative Example 1 in 100 ml of n-butanol at 100° C., the resulting solution was allowed to stand for 12 hours at the room temperature. Precipitated crystals were filtered and dried at 40° C. for 24 hours to obtain 7.8 g type (I-b)-1 crystals in the form of almost colorless crystal. Melting point 143°~146° C.

EXAMPLE 34

Preparation of Type (I-a)-2 Crystals from Amorphous Fluoran Compound of formula (I-a) in Comparative Example 2

After heat dissolving 10 g of the amorphous fluoran compound of the formula (I-a) prepared in Comparative Example 2 in 70 ml of isopropanol at 80° C., the resulting solution was allowed to stand for 12 hours at the room temperature. Precipitated crystals were filtered and dried at 40° C. for 24 hours to obtain 8.0 g of type (I-a)-2 crystals in the form of almost colorless crystal. Melting point was 158°~161° C.

EXAMPLE 35

Preparation of Type (I-c)-3 Crystals from Amorphous Fluoran Compound of formula (I-c) in Comparative Example 3

After heat-dissolving 10 g of the amorphous fluoran compound of the formula (I-c) prepared in Comparative Example 3 in 20 ml of toluene at 100° C., the resulting solution was allowed to stand for 24 hours at the room temperature. Precipitated crystals were filtered and dried at 40° C. for 24 hours to obtain 9.0 g of type (I-c)-3 crystals in the form of almost colorless crystal. Melting point is 124°~126° C.

EXAMPLE 36

Preparation of Type (I-d)-2 Crystals from Amorphous Fluoran Compound of formula (I-d) in Comparative Example 3

After heat-dissolving 10 g of the amorphous fluoran compound of the formula (I-d) prepared in Comparative Example 4 in 20 ml of benzene at 100° C., the resulting solution was allowed to stand at the room temperature for 24 hours. Precipitated crystal were filtered and dried at 40° C. for 24 hours to obtain 9.0 g of type (I-d)-2 crystals in the form of almost colorless crystal. Melting point was 148°~151° C.

EXAMPLE 37

Preparation of Heat-sensitive Recording Paper from Type (I-b)-1 Crystals

A mixture of 10 g of type (I-b)-1 crystals, 5 g of a 10% aqueous polyvinyl alcohol solution and 37.5 g of water was pulverized to a particle size of 3 μm by using a sand mill. Separately, bisphenol A was dispersed by the similar manner to obtain a 38% dispersion of developer.

Then 65.8 g of the developer dispersion obtained, 50 g of the above aqueous dispersion of the type (I-b)-1 crystals, 18.3 g of a 60% aqueous precipitated calcium carbonate dispersion, 88 g of a 10% aqueous polyvinyl alcohol solution and 51.9 g of water were mixed.

The mixture obtained was applied to a white base paper by using a wire rod No. 10 and air-dried at the room temperature to obtain a heat-sensitive recording paper. When the heat-sensitive recording paper is heated, a slightly reddish black color was very quickly developed.

Further, the whiteness of uncolored portion on the heat-sensitive recording paper was better than the recording paper prepared by using the amorphous fluoran compound of the formula (I-b).

EXAMPLES 38–61

The same procedures as described in Example 37 were carried out except that the type (I-b)-1 crystals were replaced by type (I-a)-1 crystals, type (I-a)2 crystals, type (I-a)-3 crystals, type (I-a)-4 crystals, type (I-a)5 crystals, type (I-a)-6 crystals, type (I-b)-2 crystals, type (I-b)-3 crystals, type (I-b)-4 crystals, type (I-b)-5 crystals, type (I-b)-6 crystals, type (I-b)-7 crystals, type (I-b)-8 crystals, type (I-b)-9 crystals, type (I-c)-1 crystals, type (I-c)-2 crystals, type (I-c)-3 crystals, type (I-c)-4 crystals, type (I-d)-1 crystals, type (I-d)-2 crystals, type (I-d)-3 crystals, type (I-d)-4 crystals, type (I-d)-5 crystals and type (I-d)-6 crystals, respectively. Thus the heat-sensitive recording papers were respectively prepared. When these heat-sensitive recording papers were heated, any papers very quickly developed slightly reddish black color.

COMPARATIVE EXAMPLES 5–8

The same procedures as described in Example 37 were carried out except that type (I-b)-1 crystals were individually replaced by the amorphous fluoran compounds of the formulas (I-b), (I-a), (I-c) and (I-d) which were respectively prepared in Comparative Examples 1–4. Heat-sensitive recording papers were thus prepared.

These heat-sensitive recording papers caused remarkably dark grey coloring (soiling) on the uncolored portion of the paper as illustrated in Table 4.

Further, the uncolored portion of these heat-sensitive recording paper led to marked discoloration by exposure to sunlight.

EXAMPLE 62

Preparation of Pressure-sensitive Recording Paper from Type (I-a)-1 Crystals

Coated back (CB) sheet and coated front (CF) sheet were prepared by the following procedures.

A mixture of 100 g of a 10% aqueous solution of ethylene-maleic anhydride copolymer and 240 g of water was adjusted to pH 4.0 with a 10% sodium hydroxide solution and mixed with 200 g of a solution containing 5% by weight of the type (I-a)-1 crystals of Example 1 in phenylxylylethane, SAS-296 (Trade mark of Nippon Petrochemical). After emulsifying the resultant mixture with a homomixer, 60 g of an aqueous methylolmelamine solution having a solid content of 50%, URAMINE T-30 (Trade mark of Mitsui Toatsu Chemicals), was added and stirred at 55° C. for 3 hours to obtain a microcapsule dispersion having an average particle size of 5.0 μm.

To 100 g of the microcapsule dispersion, 4.0 g of wheat starch, 20 g of 20% paste of oxidized starch and 116 g of water were added and dispersed. The dispersion thus obtained was applied on a paper having a basis weight of 40 g/m$^2$ so as to obtain a coating weight of 5 g/m$^2$ as solid, CB sheet was thus obtained.

On the other hand, in order to prepare CF sheet, zinc salt of substituted salicyclic acid-styrene copolymer was pulverized in water with a sand grinding mill in the presence of a small amount of a high molecular weight anionic surfactant to obtain an aqueous dispersion containing 40% by weight of solid. Using the aqueous dispersion, a coating compound (30% solid content) having the below described composition was prepared and applied on a wood free paper having a basis weight of 40 g/m$^2$ so as to obtain a coating weight of 5.5 g/m$^2$.

Thus CF sheet was obtained.

| Composition of aqueous coating compound | Weight of solid (g) |
| --- | --- |
| precipitated calcium carbonate | 100 |
| Developer | 20 |
| Binder (Oxidized starch) | 8 |
| Binder (Synthetic latex) | 8 |

The microcapsule coated CB sheet and the developer coated CF sheet were overlapped so as to bring both coated surfaces into contact with each other. When pressure was applied on the overlapped sheets with a pencil, reddish black image was emerged on the developer coated surface. The developed color image had practically no problem on the resistance to light, moisture and $NO_x$.

EXAMPLES 63–86

The same procedures as described in Example 62 were carried out except that the type (I-a)-1 crystals were replaced by type (I-a)-2 crystals, type (I-a)-3 crystals, type (I-a)-4 crystals, type (I-a)-5 crystals, type (I-a)-6 crystals, type (I-b)-1 crystals, type (I-b)-2 crystals, type (I-b)-3 crystals, type (I-b)-4 crystals, type (I-b)-5 crystals, type (I-b)-6 crystals, type (I-b)-7 crystals, type (I-b)-8 crystals, type (I-b)-9 crystals, type (I-c)-1 crystals, type (I-c)-2 crystals, type (I-c)-3 crystals, type (I-c)-4 crystals, type (I-d)-1 crystals, type (I-d)-2 crystals, type (I-d)-3 crystals, type (I-d)-4 crystals, type (I-d)-5 crystals, type (I-d)-6 crystals, respectively. Thus CB sheets and CF sheets were respectively prepared and images were obtained by the same procedures as in Example 62.

The developed color images had practically no problem on the resistance to light, moisture and $NO_x$.

What is claimed is:

1. A recording material comprising a support having at least one layer thereon containing crystal of the fluoran compound of the formula (I):

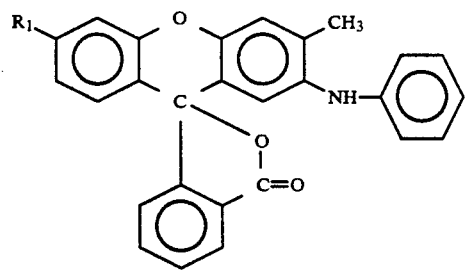

wherein $R_1$ in the formula (I) is:

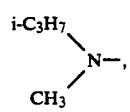

and the crystal has an X-ray diffraction diagram having a high peak at a diffraction angle ($2\theta$) of 6.4° in X-ray diffraction analysis by the Cu-K$\alpha$ beam,

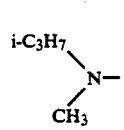

and the crystal has an X-ray diffraction diagram having high peaks at diffraction angles ($2\theta$) of 20.3° and 20.5° in X-ray diffraction analysis by the Cu-K$\alpha$ beam,

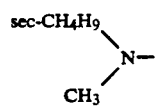

and the crystal has an X-ray diffraction diagram having high peaks at diffraction angles ($2\theta$) of 7.1°, 18.5°, 20.0°, 20.5° and 21.4° in X-ray diffraction analysis by the Cu-K$\alpha$ beam,

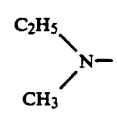

and the crystal has an X-ray diffraction diagram having high peaks at diffraction angles ($2\theta$) of 16.5° and 20.4° and relatively high peaks at 11.9°, 17.8°, 18.3°, 19.2° and 20.0° in X-ray diffraction analysis by the Cu-K$\alpha$ beam, or

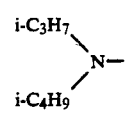

and the crystal has an X-ray diffraction diagram having high peaks at diffraction angles ($2\theta$) of 16.3° and relatively high peaks at 19.7°, 20.1° and 21.4° in X-ray diffraction analysis by the Cu-K$\alpha$ beam.

2. A recording material comprising support having at least one layer thereon containing crystalline solvate of a fluoran compound represented by the formula (I):

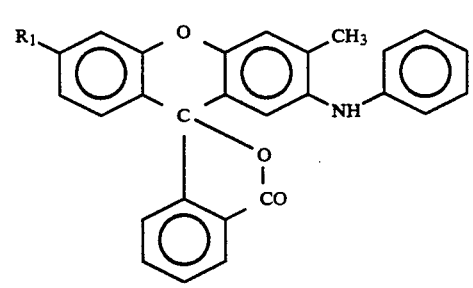

wherein $R_1$ is

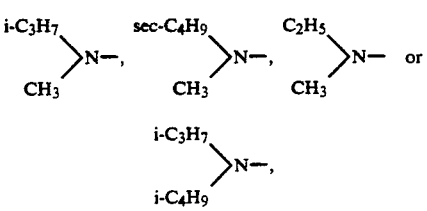

and an aromatic hydrocarbon-based solvent, alcohol-based solvent or a ketone-based solvent.

3. The recording material of claim 2, wherein the crystalline solvate is formed with an aromatic hydrocarbon-based solvent which is benzene, toluene, xylene, ethylbenzene, anisole or chlorobenzene.

4. The recording material of claim 2, wherein the crystalline solvate is formed with an alcohol-based solvent which is isopropanol.

5. The recording material of claim 2, wherein the crystalline solvate is formed with a ketone-based solvent which is acetone or methyl ethyl ketone.

6. The recording material of claim 2, wherein the fluoran compound $R_1$ is

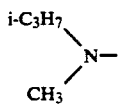

and the solvate is formed with an aromatic hydrocarbon-based solvent which is benzene, toluene, o-xylene or anisole.

7. The recording material of claim 2, wherein in the fluoran compound $R_1$ is

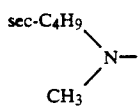

and the solvate is formed with an aromatic hydrocarbon-based solvent which is benzene, toluene, o-xylene, m-xylene, p-xylene, ethylbenzene, anisole or chlorobenzene.

8. The recording material of claim 2 wherein, the fluoran compound, $R_1$ is

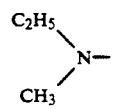

and the solvate is formed with an aromatic hydrocarbon-based solvent which is benzene, toluene or anisole.

9. The recording material of claim 2, wherein, in the fluoran compound, $R_1$ is

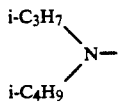

and the solvate is formed with an aromatic hydrocarbon-based solvent which is benzene or toluene.

10. The recording material of claim 2 wherein in the fluoran compound $R_1$ is

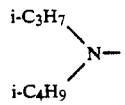

and the solvate is formed with an alcohol-based solvent which is isopropanol.

11. The recording material of claim 2, wherein, in the crystalline solvate of the fluoran compound, $R_1$ is

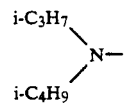

and the solvate is formed with a ketone-based solvent which is acetone or methyl ethyl ketone.

* * * * *